US012400411B2

(12) United States Patent
Su et al.

(10) Patent No.: US 12,400,411 B2
(45) Date of Patent: Aug. 26, 2025

(54) METHOD, PROCESSING DEVICE, AND DISPLAY SYSTEM FOR INFORMATION DISPLAY

(71) Applicant: Industrial Technology Research Institute, Hsinchu (TW)

(72) Inventors: Yu-Hsuan Su, Kaohsiung (TW); Hsin-Hung Chen, Kaohsiung (TW); Chia-Hsun Tu, Taipei (TW); Yu-Hsiang Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 258 days.

(21) Appl. No.: 17/984,220

(22) Filed: Nov. 9, 2022

(65) Prior Publication Data

US 2023/0162459 A1 May 25, 2023

Related U.S. Application Data

(60) Provisional application No. 63/278,071, filed on Nov. 10, 2021.

(30) Foreign Application Priority Data

Sep. 30, 2022 (TW) .................................. 111137134

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/013* (2013.01); *G06F 3/14* (2013.01); *G06T 7/20* (2013.01);
(Continued)

(58) Field of Classification Search
None
See application file for complete search history.

(56) References Cited

U.S. PATENT DOCUMENTS

| 7,940,962 B2 | 5/2011 | Hammoud |
| 10,074,346 B2 | 9/2018 | Noda |

(Continued)

FOREIGN PATENT DOCUMENTS

| CN | 105528065 | 4/2016 |
| CN | 101233540 | 5/2016 |

(Continued)

OTHER PUBLICATIONS

"Office Action of Taiwan Counterpart Application", issued on May 3, 2023, p. 1-p. 4.

*Primary Examiner* — Yi Wang
(74) *Attorney, Agent, or Firm* — JCIPRNET

(57) ABSTRACT

A method, a processing device, and a system for information display are proposed, and the system include a first light transmissive display and a second light transmissive display disposed adjacent to each other. Multiple sensing information capturing devices capture position information and posture information of at least one user and capture position information of at least one target object. A processing device is configured to: determine a user number of the at least one user located in front of the first light transmissive display and the second light transmissive display; determine display position information of a virtual object associated with the user according to the user number, the position information and the posture information of the user, and the position information of the target object; and display the virtual object corresponding to the target object according to the display position information.

15 Claims, 16 Drawing Sheets

(51) Int. Cl.
*G06F 3/14* (2006.01)
*G06T 7/20* (2017.01)
*G06T 7/70* (2017.01)
*G09G 5/36* (2006.01)

(52) U.S. Cl.
CPC ............... *G06T 7/70* (2017.01); *G09G 5/36* (2013.01); *G06T 2207/30196* (2013.01); *G06T 2219/2004* (2013.01)

(56) References Cited

U.S. PATENT DOCUMENTS

| | | | |
|---|---|---|---|
| 2014/0232630 A1* | 8/2014 | Plaehn | G06F 3/013 345/156 |
| 2017/0322633 A1 | 11/2017 | Shen et al. | |
| 2019/0050664 A1 | 2/2019 | Yang et al. | |
| 2020/0073509 A1* | 3/2020 | Shih | G06F 3/017 |
| 2021/0081271 A1 | 3/2021 | Doshi et al. | |

FOREIGN PATENT DOCUMENTS

| | | |
|---|---|---|
| CN | 108287675 | 7/2018 |
| CN | 208806869 | 4/2019 |
| CN | 111966310 | 11/2020 |
| CN | 112130794 | 12/2020 |
| TW | 1490850 | 7/2015 |
| TW | 202015430 | 4/2020 |
| TW | 202017368 | 5/2020 |
| TW | 734024 | 7/2021 |

* cited by examiner

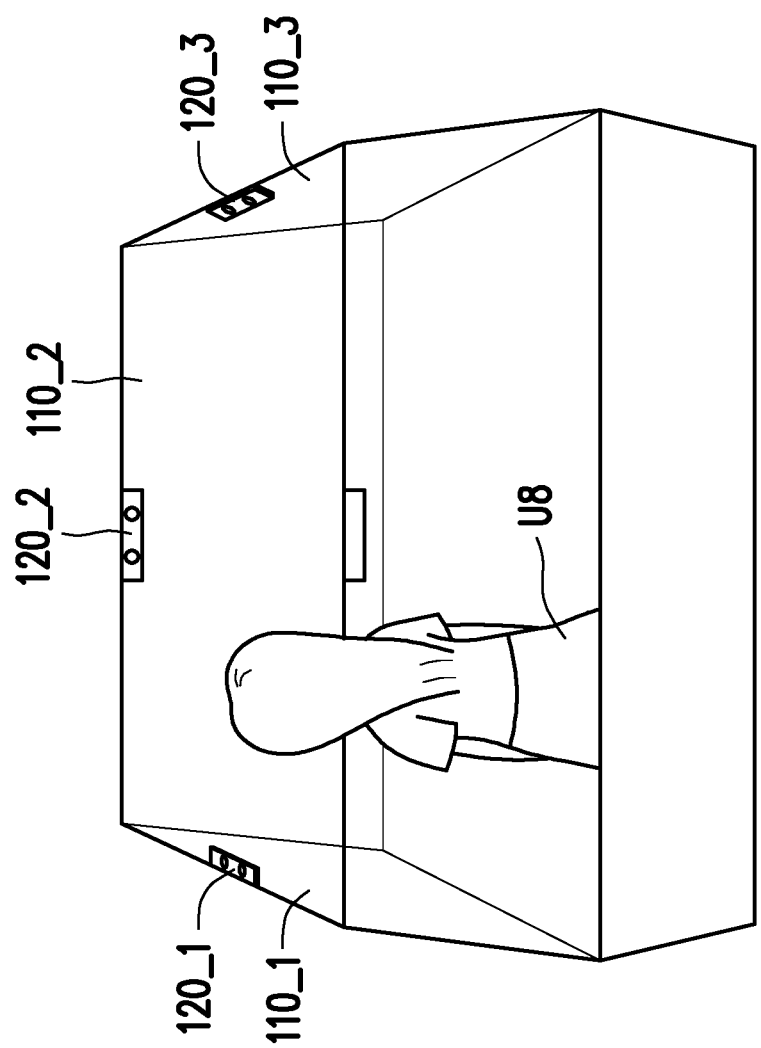

METHOD, PROCESSING DEVICE, AND DISPLAY SYSTEM FOR INFORMATION DISPLAY

CROSS-REFERENCE TO RELATED APPLICATION

This application claims the priority benefits of U.S. provisional application Ser. No. 63/278,071, filed on Nov. 10, 2021 and Taiwan application serial no. 111137134, filed on Sep. 30, 2022. The entirety of each of the above-mentioned patent applications is hereby incorporated by reference herein.

TECHNICAL FIELD

The disclosure relates to an information display technology.

BACKGROUND

With the development of image processing technology and spatial positioning technology, the application of transparent displays has gradually drawn attentions. Such type of technology allows the display to be matched with physical objects, and supplemented with related virtual information to generate an interactive experience according to the user's needs, so that information may be presented in a more intuitive way.

Furthermore, a virtual object associated with the physical object may be displayed at a specific position of the transparent display, so that the user may simultaneously view the physical object and the virtual object superimposed on or on one side of the physical object through the transparent display. For example, by disposing the transparent display on an observation deck, a viewer may watch a landscape and landscape information provided by the transparent display at the same time. However, in some large-scale application situations, it may be necessary to provide virtual-reality fusion information display services through a combination of multiple transparent displays. Therefore, how to control the transparent displays to provide the virtual-reality fusion information display services that meet the needs of various application situations is an important issue.

SUMMARY

The disclosure is related to a method, a processing device, and a system for information display.

In an exemplary embodiment of the disclosure, the system for information display includes multiple light transmissive displays, multiple sensing information capturing devices, and a processing device. The light transmissive displays include a first light transmissive display and a second light transmissive display, and the first light transmissive display and the second light transmissive display are disposed adjacent to each other. The sensing information capturing devices capture position information and posture information of at least one user and capture position information of at least one target object. The processing device is connected to the light transmissive displays and the sensing information capturing devices, and is configured to: determine a user number of the at least one user located in front of the first light transmissive display and the second light transmissive display, determine display position information of at least one virtual object associated with the at least one user according to the user number, the position information and the posture information of the at least one user, and the position information of the at least one target object, and control at least one of the first light transmissive display and the second light transmissive display to display the at least one virtual object corresponding to the at least one target object according to the display position information.

In an exemplary embodiment of the disclosure, the method for information display is adapted to a system for information display including multiple light transmissive displays, multiple sensing information capturing devices, and a processing device. The light transmissive displays include a first light transmissive display and a second light transmissive display, and the first light transmissive display and the second light transmissive display are disposed adjacent to each other. The method includes following steps: using the sensing information capturing devices to capture position information and posture information of at least one user; using the sensing information capturing devices to capture position information of at least one target object; determining a user number of the at least one user located in front of the first light transmissive display and the second light transmissive display; determining display position information of at least one virtual object associated with the at least one user according to the user number, the position information and the posture information of the at least one user, and the position information of the at least one target object, and controlling at least one of the first light transmissive display and the second light transmissive display to display the at least one virtual object corresponding to the at least one target object according to the display position information.

In an exemplary embodiment of the disclosure, the processing device is connected to multiple light transmissive displays and multiple sensing information capturing devices. The processing device includes a memory and a processor connected to the memory. The memory is configured to store data, and the processor is configured to: obtain position information and posture information of at least one user from the sensing information capturing devices, obtain position information of at least one target object from the sensing information capturing devices, determine a user number of the at least one user located in front of a first light transmissive display and a second light transmissive display, determine display position information of at least one virtual object associated with the at least one user according to the user number, the position information and the posture information of the at least one user, and the position information of the at least one target object, and control at least one of the first light transmissive display and the second light transmissive display to display the at least one virtual object corresponding to the at least one target object according to the display position information.

In order for the disclosure to be more comprehensible, several embodiments accompanied with drawings are described in detail as follows.

BRIEF DESCRIPTION OF THE DRAWINGS

FIG. 7C is a schematic diagram of an application situation of a system for information display according to an exemplary embodiment of the disclosure.

DETAILED DESCRIPTION OF DISCLOSED EMBODIMENTS

Some exemplary embodiments of the disclosure will be described in detail below with reference to the accompanying drawings. Regarding the component symbols quoted in the following description, when the same component symbols appear in different drawings, they are regarded as the same or similar components. These exemplary embodiments are only a part of the disclosure, and do not disclose all possible implementations of the disclosure. To be more specific, these example embodiments are merely examples of methods, devices, and systems within the claims of the disclosure.

Figure 1A:
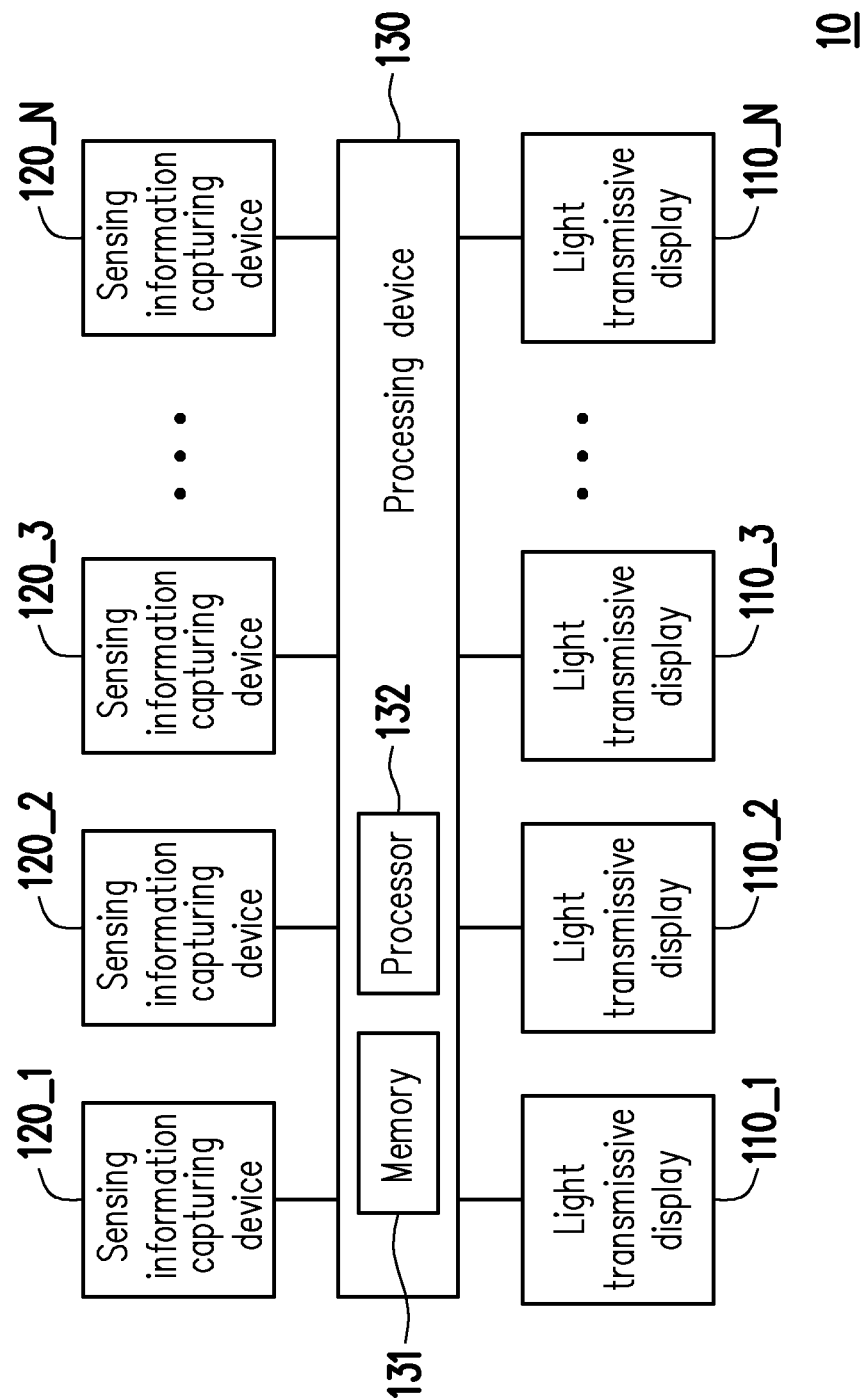
FIG. 1A is a block diagram of a system for information display according to an exemplary embodiment of the disclosure.

FIG. 1A is a block diagram of a system for information display according to an exemplary embodiment of the disclosure. First, FIG. 1A first introduces each component and a configuration relationship thereof in the system, and detailed functions of the components will be disclosed together with flowcharts in subsequent exemplary embodiments.

Referring to FIG. 1A, a system 10 for information display in the exemplary embodiment may include multiple light transmissive displays 110_1, 110_2, 110_3, . . . , 110_N, multiple sensing information capturing devices 120_1, 120_2, 120_3, . . . , 120_N, and a processing device 130. The processing device 130 may be connected to the light transmissive displays 110_1-110_N and the sensing information capturing devices 120_1-120_N in a wireless, wired or electrical connection manner.

The light transmissive displays 110_1-110_N may be used to display information, which may include a single display device or a combination of multiple display devices, and the display device may be, for example, a liquid crystal display (LCD), a field sequential color LCD, a light emitting diode (LED) display, an electrowetting display and other light transmissive displays, or projection type light transmissive displays. It should be noted that these light transmissive displays 110_1-110_N may be disposed adjacent to each other in a coplanar or non-coplanar manner. In some embodiments, the light transmissive displays 110_1-110_N may be configured as multiple window screens of a mobile vehicle (such as a cableway carriage, a car, a tourist bus, a boat or an airplane, etc.), so that users may view external scene objects and virtual objects displayed by the light transmissive displays 110_1-110_N during a process of riding the mobile vehicle.

The sensing information capturing devices 120_1-120_N may be used to capture position information and posture information of a user. The sensing information capturing devices 120_1-120_N include sensing devices for capturing user information. In some embodiments, the sensing information capturing devices 120_1-120_N may include at least one image sensor or at least one image sensor in collaboration with at least one depth sensor or an electromagnetic sensing device, so as to capture image data of the user located in front of the light transmissive displays 110_1-110_N, and accordingly perform image recognition and positioning on the user. The aforementioned image sensor may be a visible light sensor or an invisible light sensor such as an infrared sensor, etc. In addition, the sensing information capturing devices 120_1-120_N may also include an optical locator/electromagnetic sensing device to perform optical/electromagnetic field spatial positioning on the user. In some embodiments, the sensing information capturing devices 120_1-120_N may also identify poses presented by limbs, a torso and/or a head of the user by using various human pose recognition technologies. For example, the sensing information capturing devices 120_1-120_N may identify a human body skeleton, human body feature points, etc., according to the image data, so as to identify a posture of the user. As long as the devices or a combination thereof are capable of positioning the position information of the user and recognizing the posture information of the user, they belong to the sensing information capturing devices 120_1-120_N.

On the other hand, the sensing information capturing devices 120_1-120_N may be used to capture position information of a target object in a physical scene. The sensing information capturing devices 120_1-120_N include a sensing device for capturing target object information. In some embodiments, the sensing information capturing devices 120_1-120_N may include at least one image sensor or at least one image sensor in collaboration with at least one depth sensor, so as to capture image data of the target object located behind the light transmissive displays 110_1-110_N (another side relative to the user), and accordingly perform image recognition and positioning on the target object. The aforementioned image sensor may be a visible light sensor or an invisible light sensor such as an infrared sensor, etc. Or, space objects are by detected and positioned through sensing changes of an electric field or magnetic field. As long as the devices or a combination thereof are capable of positioning the position information of the target object, they belong to the sensing information capturing devices 120_1-120_N.

In the embodiment of the disclosure, the above-mentioned image sensor may be used for capturing images and may include a camera lens having a lens and a photosensitive element. The above-mentioned depth sensor may be used to detect depth information, which may be implemented by using an active depth sensing technology or a passive depth sensing technology. The active depth sensing technology may calculate the depth information by actively emitting a light source, infrared rays, ultrasonic waves, a laser, etc., as signals in collaboration with a time difference ranging technology. The passive depth sensing technology may capture two images in front of two image sensors from different viewing angles, so as to use a parallax of the two images to calculate the depth information.

In some embodiments, the sensing information capturing devices 120_1-120_N may further include sensors for sensing scene information of the physical scene. For example, the sensing information capturing devices 120_1-120_N may include a global positioning system (GPS) device, an electronic compass, an electromagnetic induction device or a gravity sensor, etc., which may provide GPS information, orientation information, and tilt information of a mobile carrier configured with the light transmissive displays 110_1-110_N to the processing device 130.

In some embodiment, the sensing information capturing devices 120_1-120_N may transmit information to the processing device 130 in a wired or wireless manner through their respective communication interfaces. In some embodiments, the sensing information capturing devices 120_1-120_N have processors and memories, and have computing capabilities capable of performing object recognition and object tracking according to image data.

The processing device 130 is used to control operations of the system 10 for information display. In some embodiments, the processing device 130 may be one computer device a combination of multiple computer devices, which is not limited in the disclosure. When the processing device 130 is implemented as the computer devices, the computer devices may be connected and communicated with each other through multiple gateway devices, and the gateway devices support a wireless transmission protocol or a wired transmission protocol, which is not limited in the disclosure.

In some embodiments, the processing device 130 includes a memory 131 and a processor 132. The memory 131 may be, for example, any type of fixed or movable random access memory (RAM), a read-only memory (ROM), a flash memory (flash memory), a hard disk or other similar devices, integrated circuits or a combination thereof. The processor 142 may be, for example, a central processing unit (CPU), an application processor (AP), or other programmable general-purpose or special-purpose microprocessors, a digital signal processor (DSP), an image signal processor (ISP), a graphics processing unit (GPU), or other similar devices, integrated circuits, or a combination thereof. In the following exemplary embodiments, details of a method for information display executed by the processing device 130 are introduced below in the following exemplary embodiment with reference of various components of the system 10 for information display.

Figure 1B:
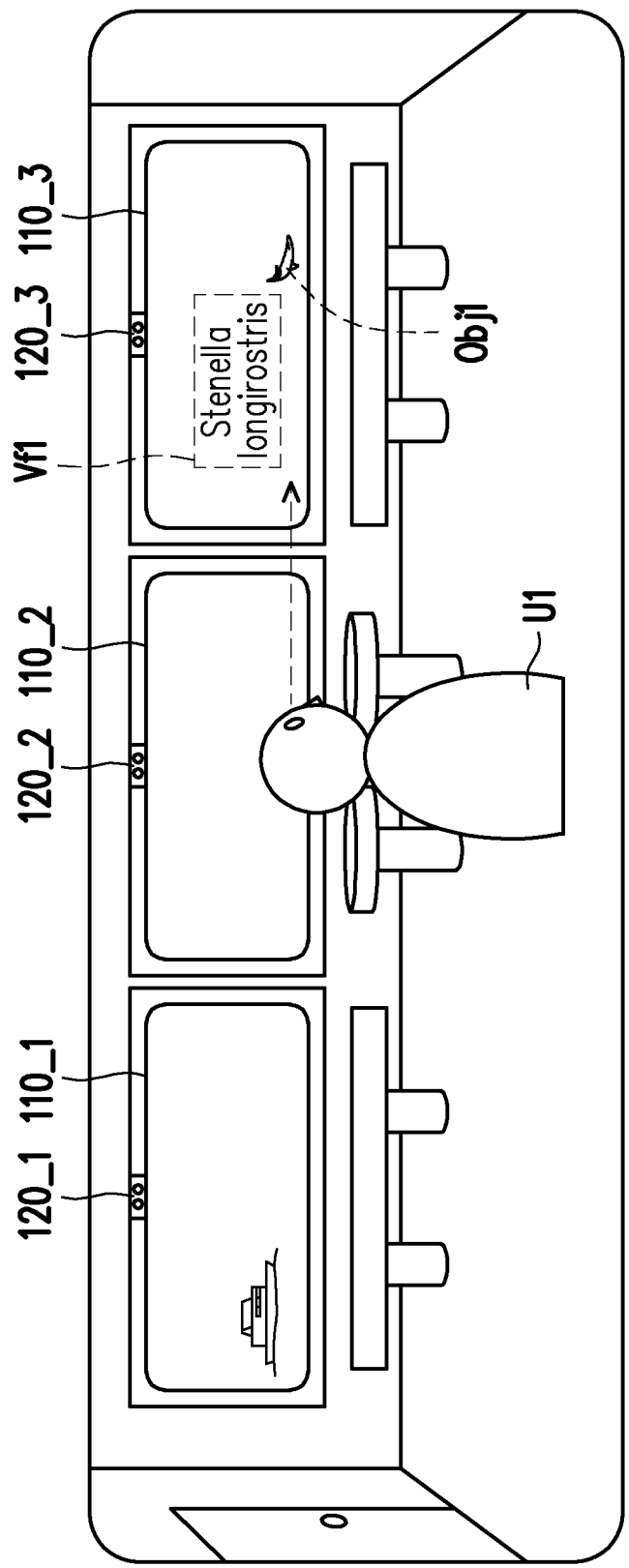
FIG. 1B is a schematic diagram of a system for information display according to an exemplary embodiment of the disclosure.

FIG. 1B is a schematic diagram of a system for information display according to an exemplary embodiment of the disclosure. For the convenience and clarity's sake, in FIG. 1B, three light transmissive displays 110_1-110_3 and three sensing information capturing devices 120_1-120_3 are used as an example for description, but the disclosure is not limited thereto. Referring to FIG. 1B, the light transmissive display 110_1 is disposed adjacent to the light transmissive display 110_2, and the light transmissive display 110_2 is disposed adjacent to the light transmissive display 110_3. A user U1 and a target object Obj1 are respectively located at a front side and a back side of the light transmissive displays 110_1-110_3.

In the exemplary embodiment of FIG. 1B, based on sightline information and position information of the user U1, the user U1 may view a physical scene superimposed with a virtual object Vf1 of the target object Obj1 through the light transmissive display 110_3. The virtual object Vf1 may be regarded as augmented reality content augmented based on the target object Obj1. Namely, the processing device 130 may determine display position information of the virtual object Vf1 on the light transmissive display 110_3 according to position information and posture information of the user U1 and the position information of the target object Obj1. In this way, the processing device 130 may control the light transmissive display 110_3 to display the virtual object Vf1 corresponding to the target object Obj1 according to the display position information, so that the user U1 may view the virtual object Vf1 near the target object Obj1 through the light transmissive display 110_3.

However, FIG. 1B is only an exemplary illustration, and a user number may not be limited to one. In some embodiments, the user number may be more than one, and the processing device 130 may determine a display manner of the virtual object according to the user number. In addition, it should be noted that, in some embodiments, the processing device 130 may use one or more light transmissive displays 110_1-110_3 to display the virtual object for one or more users to view, so as to realize a cross-screen display function.

Figure 2:
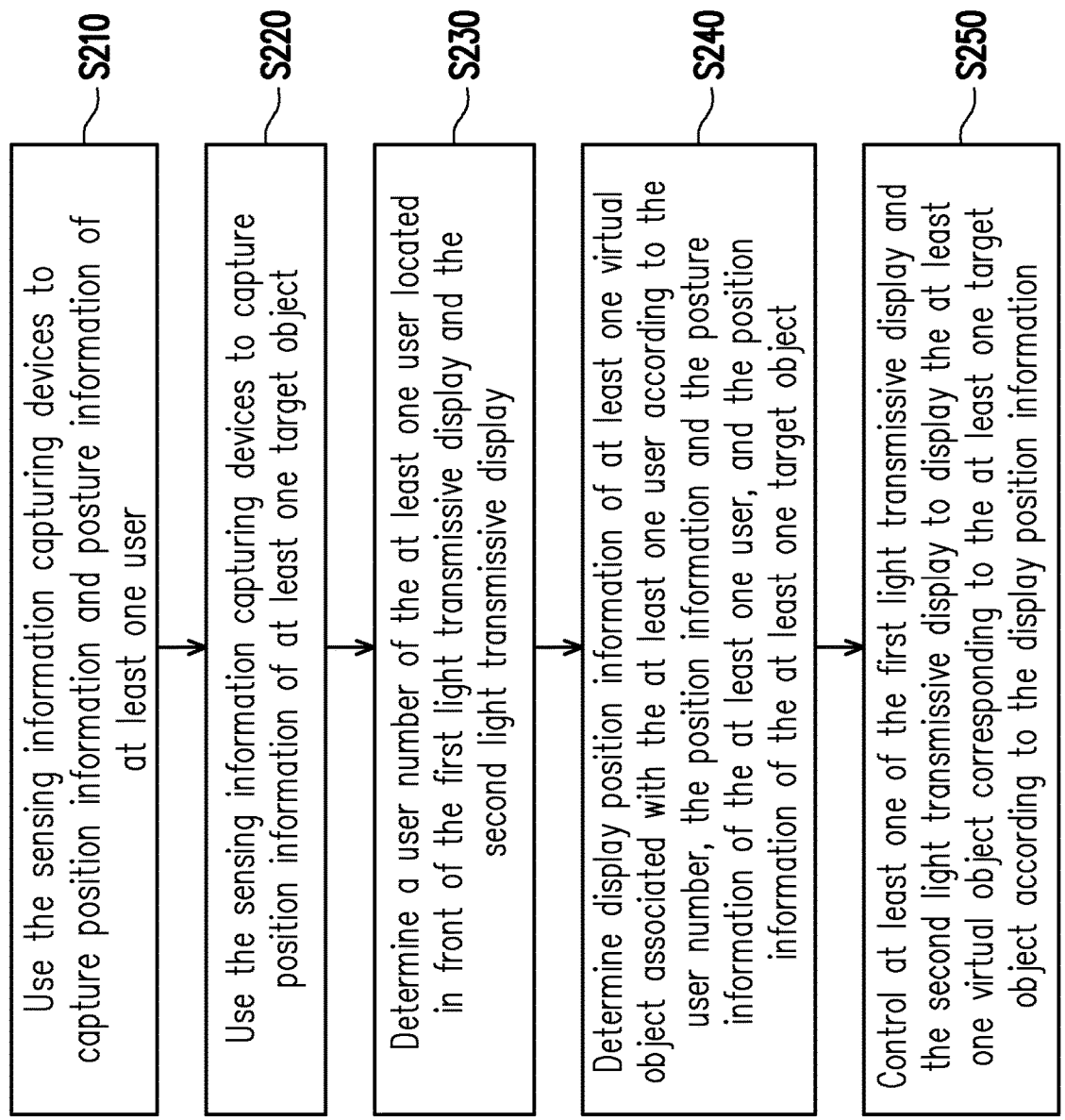
FIG. 2 is a flowchart of a method for information display according to an example embodiment of the disclosure.

FIG. 2 is a flowchart of a method for information display according to an example embodiment of the disclosure. Referring to FIG. 1A and FIG. 2 at the same time, and the method flow of FIG. 2 may be implemented by the system 10 for information display of FIG. 1A.

In step S210, the processing device 130 uses the sensing information capturing devices 120_1-120_N to capture position information and posture information of at least one user. In step S220, the processing device 130 uses the sensing information capturing devices 120_1-120_N to capture position information of at least one target object. As described above, the sensing information capturing devices 120_1-120_N are, for example, image sensors, depth sensors, or a combination thereof, which may locate positions of the at least one user and the at least one target object.

In step S230, the processing device 130 determines a user number of users located in front of a first light transmissive display and a second light transmissive display, where the first light transmissive display and the second light transmissive display are disposed adjacent to each other. Taking FIG. 1B as an example, the processing device 130 may respectively determine the user number of users in front of the adjacent light transmissive display 110_1 and light transmissive display 110_2. Alternatively, the processing device 130 may respectively determine the user number of users in front of the adjacent light transmissive display 110_2 and light transmissive display 110_3. Alternatively, the processing device 130 may respectively determine the user number of users in front of the adjacent light transmissive displays 110_1-110_3. The processing device 130 may respectively determine the user number of users in front of each of the light transmissive displays 110_1-110_3 through the image data captured by the sensing information capturing devices 120_1-120_3. Based on the user number of users in front of the adjacent light transmissive displays, the processing device 130 may determine whether it is a single-user viewing situation or a multiple-user viewing situation.

In step S240, the processing device 130 determines the display position information of the at least one virtual object associated with the at least one user according to the user number of users, the position information and the posture information of the at least one user, and the position information of the at least one target object. In some embodiments, the processing device 130 may determine an authority of each user to view the virtual object through each light transmissive display according to the user number of users in front of the adjacent multiple light transmissive displays, so as to further display the virtual object on a suitable light transmissive display.

In some embodiments, when the user number of users in front of the adjacent light transmissive displays is equal to 1, the single user may have the authority to view the virtual object through the light transmissive displays. In some embodiments, when the user number of users in front of the adjacent light transmissive displays is greater than 1, the processing device 130 may determine that these users share the light transmissive displays, so that the multiple users may simultaneously have the authority to view the virtual object through the light transmissive displays. Alternatively, in some embodiments, when the user number of users in front of the adjacent light transmissive displays is greater than 1, the processing device 130 may determine that these users do not share the light transmissive displays, so that each user may have the authority to view the virtual object via the closest light transmissive display.

In some embodiments, when a certain user has the authority to view the virtual object through the light transmissive displays, the processing device 130 may splice user images captured by a part of the sensing information capturing devices 120_1-120_N. The processing device 130 may locate the user according to the above spliced image, and perform coordinate transformation according to the position information and the posture information of the user and the position information of the target object, so as to calculate the display position information of the virtual object of the target object viewed by the user on one or more light transmissive displays. In some embodiments, the processing device 130 may acquire the display position information according to sizes and resolutions of the light transmissive displays 110_1-110_N, and the display position information includes pixel coordinates under a pixel coordinate system of the light transmissive displays 110_1-110_N.

In step S250, the processing device 130 controls at least one of the first light transmissive display and the second light transmissive display to display the at least one virtual object corresponding to the at least one target object according to the display position information. In some embodiments, the processing device 130 may display a single virtual object through the first transmissive display and the second transmissive display at the same time, or the processing device 130 may display the single virtual object through the first transmissive display and the second transmissive display in success. In the above cases, the display position information of the virtual object may include display position information corresponding to the first light transmissive display and display position information corresponding to the second light transmissive display.

Implementations of the disclosure in different application situations are described below with reference of the system 10 for information display.

Figure 3A:
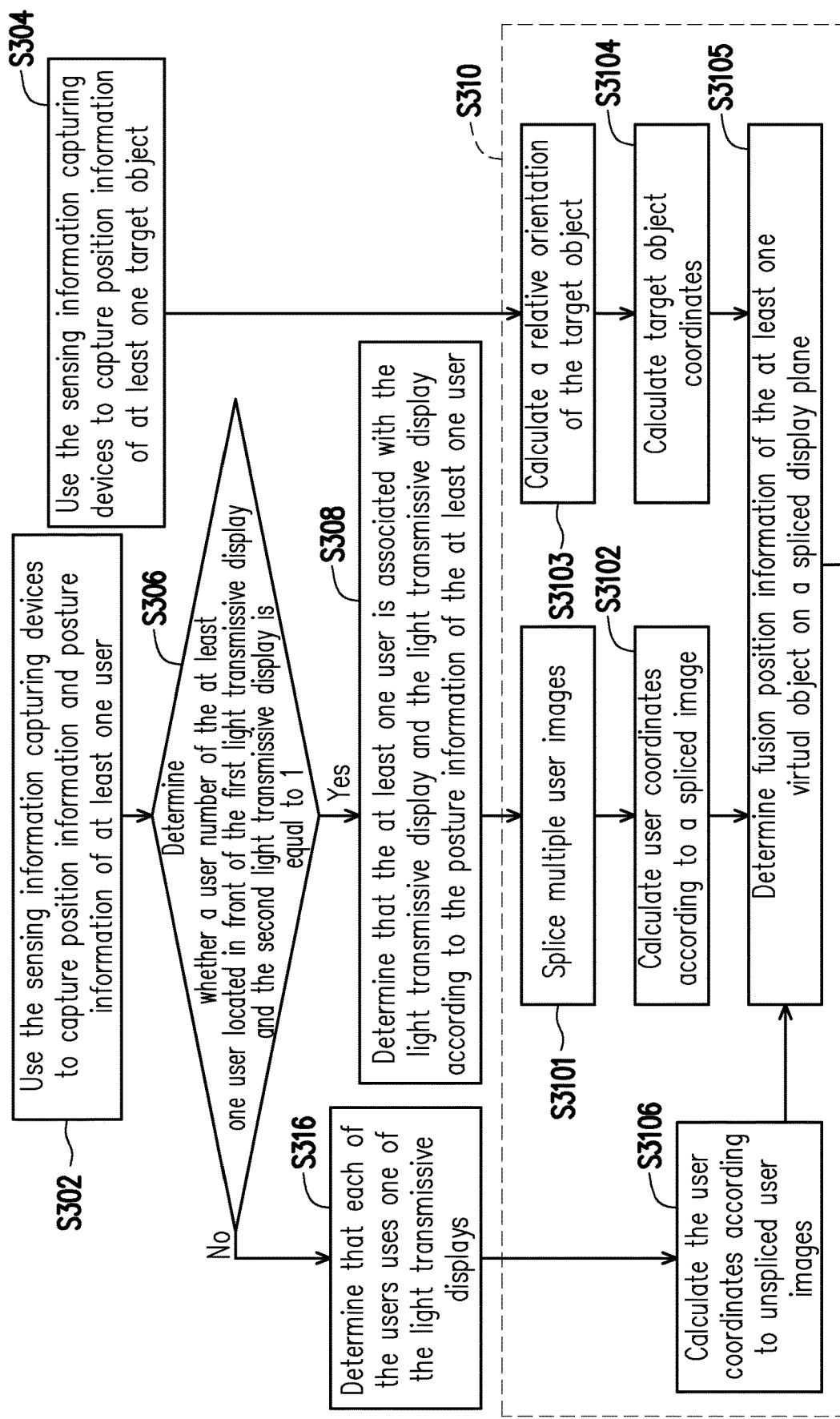
FIG. 3A and FIG. 3B are flowcharts of a method for information display according to an exemplary embodiment of the disclosure.
Figure 3B:
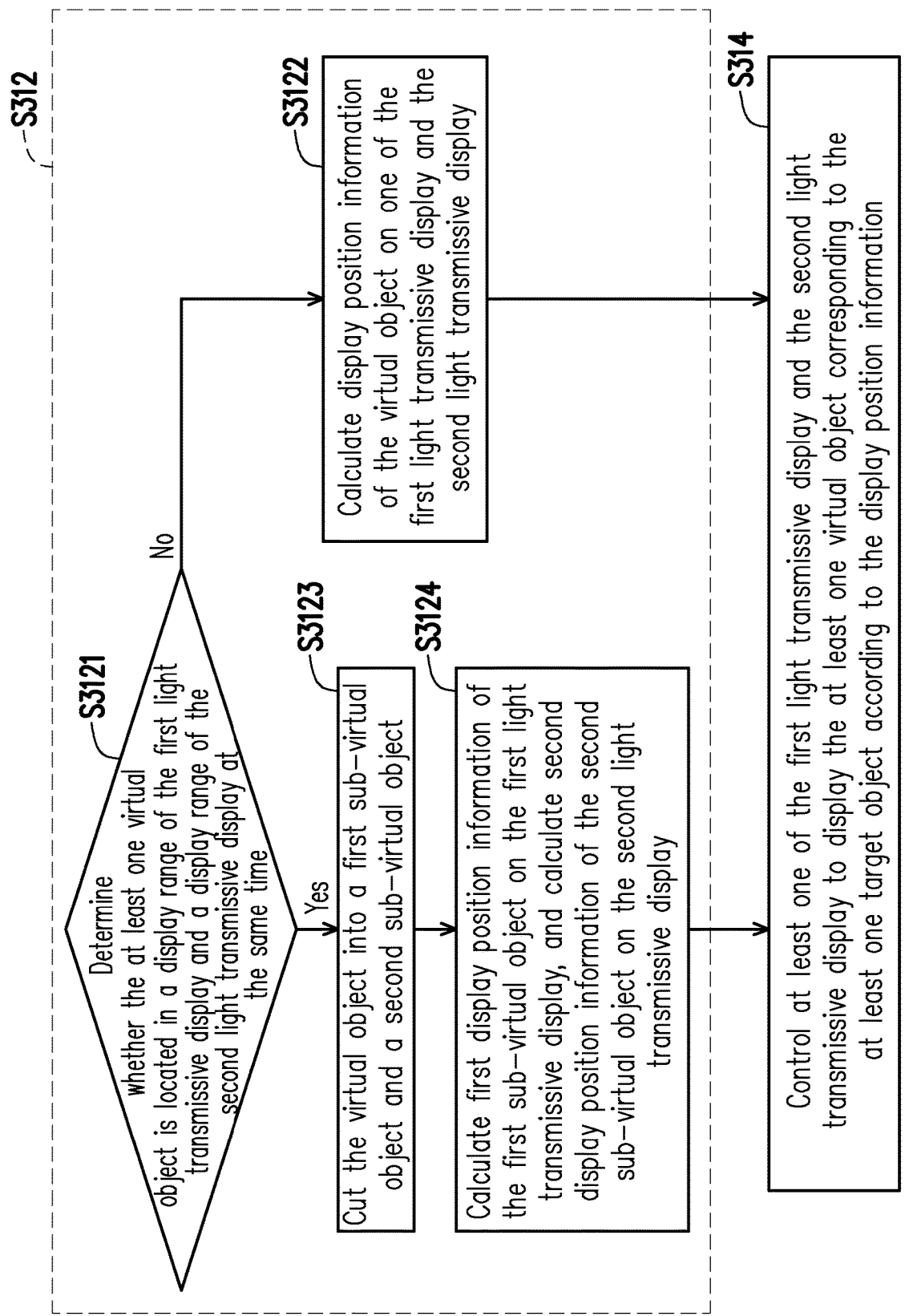
Figure 3C:
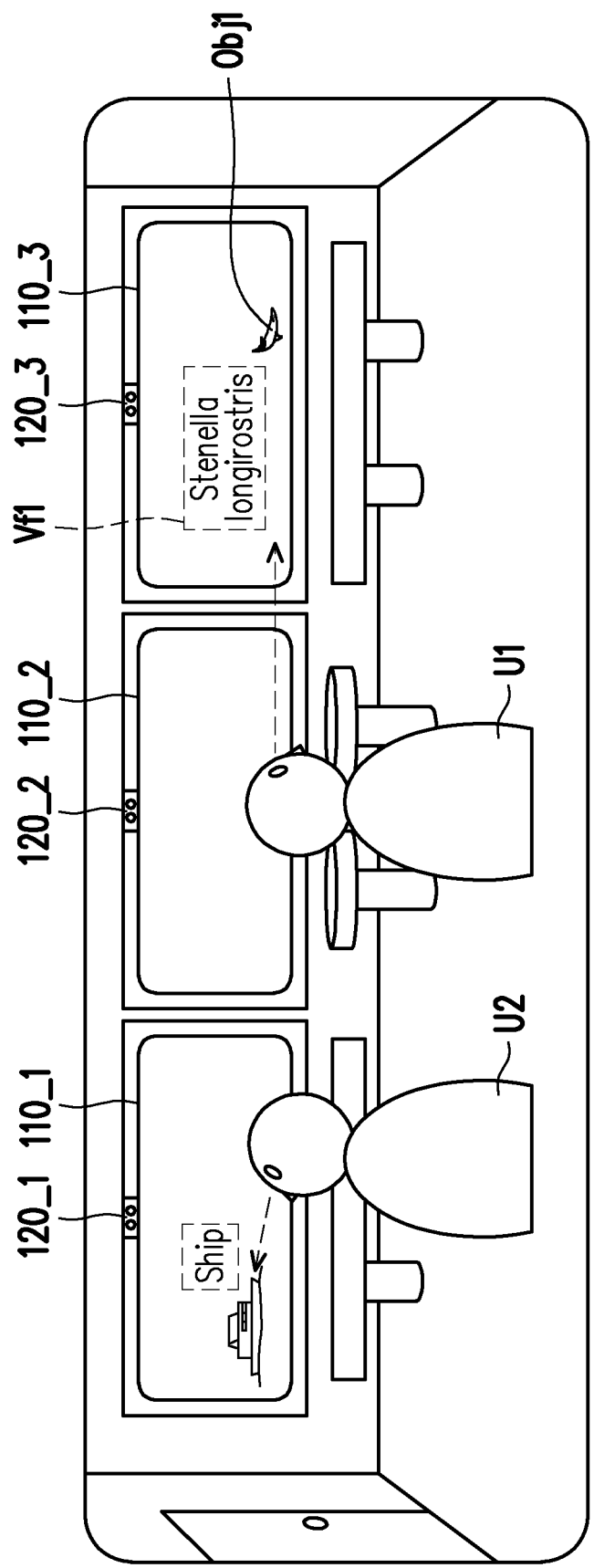
FIG. 3C and FIG. 3D are schematic diagrams of application situations of a system for information display according to an exemplary embodiment of the disclosure.
Figure 3D:
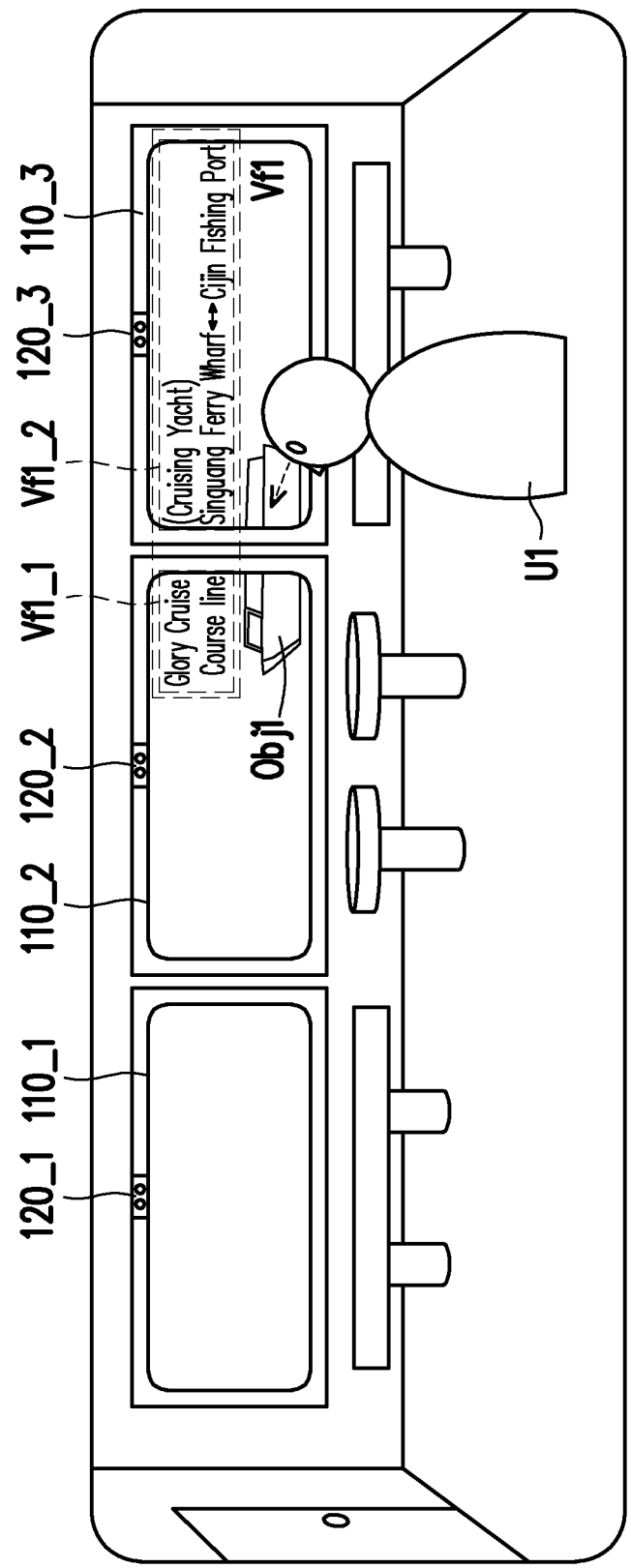

FIG. 3A and FIG. 3B are flowcharts of a method for information display according to an exemplary embodiment of the disclosure. FIG. 3C and FIG. 3D are schematic diagrams of application situations of a system for information display according to an exemplary embodiment of the disclosure. Referring to FIG. 3A, FIG. 3B, FIG. 3C and FIG. 3D at the same time, for convenience and clarity's sake, the embodiments of FIG. 3A to FIG. 3D will be described by taking three light transmissive displays 110_1-110_3 and three sensing information capturing devices 120_1-120_3 as examples, but the disclosure is not limited thereto.

The sensing information capturing device 120_2 may capture position information and posture information of a user U1 (step S302), and transmit the position information and the posture information of the user U1 to the processing device 130. One or more the sensing information capturing devices 120_1 to 120_3 may capture position information of the target object Obj1 (step S304), and transmit the position information of the target object Obj1 to the processing device 130.

The processing device 130 determines whether the user number of users in front of the adjacent light transmissive display 110_2 (i.e., the first light transmissive display) and the light transmissive display 110_3 (i.e., the second light transmissive displays) is equal to 1 (step S306). When the user number of users is equal to 1, the processing device 130 determines that the at least one user U1 is associated with the light transmissive display 110_2 and the light transmissive display 1103 according to the posture information of the at least one user U1 (step S308). If a determination result in step S306 is YES, it means that the user U1 has the authority to use multiple light transmissive displays. Therefore, the processing device 130 may determine a viewing field of view or line-of-sight information of the at least one user U1 according to the posture information of the at least one user U1, so as to select the light transmissive display 110_2 and the light transmissive display 110_3 that are more likely to be viewed by the at least one user U1 according to the viewing field of view or line-of-sight information of the at least one user U1. Moreover, when the user number of users is greater than 1, in the embodiment, the processing device 130 may determine that each user uses one of the light transmissive displays 110_1 to 120_3 (step S316), i.e., each user has the authority to use a single light transmissive display.

Then, the processing device 130 determines fusion position information of the at least one virtual object Vf1 on a spliced display plane of the light transmissive display 110_2 and the light transmissive display 110_3 according to the position information and the posture information of the at least one user U1 and the position information of the at least one target object Obj1 (step S310). When the user number of users is equal to 1, the processing device 130 may splice multiple user images captured by the sensing information capturing device 120_2 and the sensing information capturing device 120_3 (step S3101). Then, the processing device 130 may calculate user coordinates of the user U1 according to a spliced image (step S3102). In addition, when the user number of users is greater than 1, the processing device 130 may individually calculate the user coordinates of each user according to the user images captured by the sensing information capturing device 120_1-120_3 (step S3106). Taking FIG. 3C as an example, the user coordinates of the user U2 are generated according to the user image captured by the sensing information capturing device 120_1.

On the other hand, the processing device 130 may calculate a relative orientation of the target object Obj1 relative to the sensing information capturing device 120_3 (step S3103). In some embodiments, the processing device 130 may identify the relative orientation of the target object Obj1 relative to the sensing information capturing device 120_3 according to a target object image captured by the sensing information capturing device 120_3 and GPS position information of the target object Obj1. For example, the target object Obj1 may be a mobile vehicle equipped with an automatic identification system (AIS), such as a ship equipped with AIS. The automatic identification system of the target object Obj1 may provide the GPS position information, a vehicle identification code or other information of the target object Obj1 to other mobile vehicles also equipped with the AIS, i.e., the mobile vehicles equipped with the system 100 for information display, so that the processing device 130 may acquire the GPS position information of the target object Obj1. Alternatively, the target object Obj1 may be a building on land. The processing device 130 may obtain the GPS position information of the target object Obj1 according to map data. Therefore, according to the position of the system 100 for information display and the GPS position information of the target object Obj1, the processing device 130 may calculate a distance and relative direction between the position of the system 100 for information display and the target object Obj1, so as to identify the relative orientation of the target object Obj1 relative to the sensing information capturing device 120_3. Alternatively, in some embodiments, the processing device 130 may perform object recognition according to the target object image captured by the sensing information capturing device 120_3 and estimate the distance and relative orientation between the target object Obj1 and the sensing information capturing device 120_3 according to a preset size corresponding to an object recognition result and pixel data of the target object Obj1 on the target object image.

Then, the processing device 130 may calculate target object coordinates of the target object Obj1 according to the relative orientation of the target object Obj1 (step S3104). The processing device 130 may create a connection line between the user coordinates and the target object coordinates based on the line-of-sight information, so as to obtain the fusion position information according to a position of an intersection between the connection line of the user coordinates and the target object coordinates and the spliced display plane of the light transmissive display 110_2 and the light transmissive display 110_3 (step S3105).

Then, the processing device 130 may determine display position information of the at least one virtual object Vf1 on at least one of the light transmissive display 110_2 and the light transmissive display 110_3 according to a display range of the light transmissive display 110_2, a display range of the light transmissive display 110_3 and the fusion position information (step S312). According to the display range of the light transmissive display 110_2, the display range of the light transmissive display 1103, and the fusion position information generated through calculation based on the spliced display plane, the processing device 130 may determine which light transmissive display should display the virtual object Vf1, or whether two light transmissive displays are respectively used to display a part of the virtual object at the same time.

Then, the processing device 130 determines whether the at least one virtual object Vf1 is located within the display range of the light transmissive display 110_2 and the display range of the light transmissive display 110_3 at the same time according to the display range of the light transmissive display 110_2, the display range of the light transmissive display 110_3 and the fusion position information (step S3121).

If a determination result of step S3121 is no, in the example of FIG. 3C, in response to that the at least one virtual object Vf1 is located within the display range of the light transmissive display 110_3, the processing device 130 calculates the display position information of the virtual object on the light transmissive display 1103 based on the fusion position information (step S3122), so as to obtain the pixel coordinates of the virtual object Vf1 on the light transmissive display 110_3.

On the other hand, if the determination result of step S3121 is yes, in the example of FIG. 3D, in response to that the at least one virtual object Vf1 is located within the display range of the light transmissive display 110_2 and the display range of the light transmissive display 110_3 at the same time, the processing device 130 cuts the at least one virtual object Vf1 into a first sub-virtual object Vf1_1 corresponding to the light transmissive display 110_2 and a second sub-virtual object Vf1_2 corresponding to the light transmissive display 110_3 (step S3123). Namely, when the virtual object is located at a splicing junction of the light transmissive display 110_2 and the light transmissive display 110_3, the processing device 130 may control the light transmissive display 110_2 and the light transmissive display 110_3 to respectively display a part of the virtual object Vf1. Then, first display position information of the first sub-virtual object Vf1_1 on the light transmissive display 110_2 is calculated based on the fusion position information, and second display position information of the second sub-virtual object Vf1_2 on the light transmissive display 110_3 is calculated based on the fusion position information (step S3124). Namely, the processing device 130 may convert spatial position coordinates of the first sub-virtual object Vf1_1 on the spliced display plane into pixel coordinates on the light transmissive display 110_2, and convert spatial position coordinates of the second sub-virtual object Vf1_2 on the spliced display plane into pixel coordinates on the light transmissive display 110_3.

Thereafter, the processing device 130 may control at least one of the light transmissive display 110_2 and the light transmissive display 110_3 to display the at least one virtual object Vf1 corresponding to the at least one target object Obj1 according to the display position information (step S314). As shown in FIG. 3C, the light transmissive display 110_3 displays the virtual object Vf1 corresponding to the target object Obj1 for the user U1. As shown in FIG. 3D, the light transmissive display 110_2 and the light transmissive display 110_3 respectively display a part of the virtual object Vf1 corresponding to the target object Obj1 for the user U1.

It should be noted that, when a same character in the virtual object is cut and displayed on different light transmissive displays, it is easy to cause difficulty in reading due to the broken character. Therefore, in some embodiments, when processing a cutting procedure of the virtual object, the processing device 130 may further adjust a display position of the virtual object to ensure that the sub-virtual objects obtained by cutting do not have incomplete characters.

Figure 4:
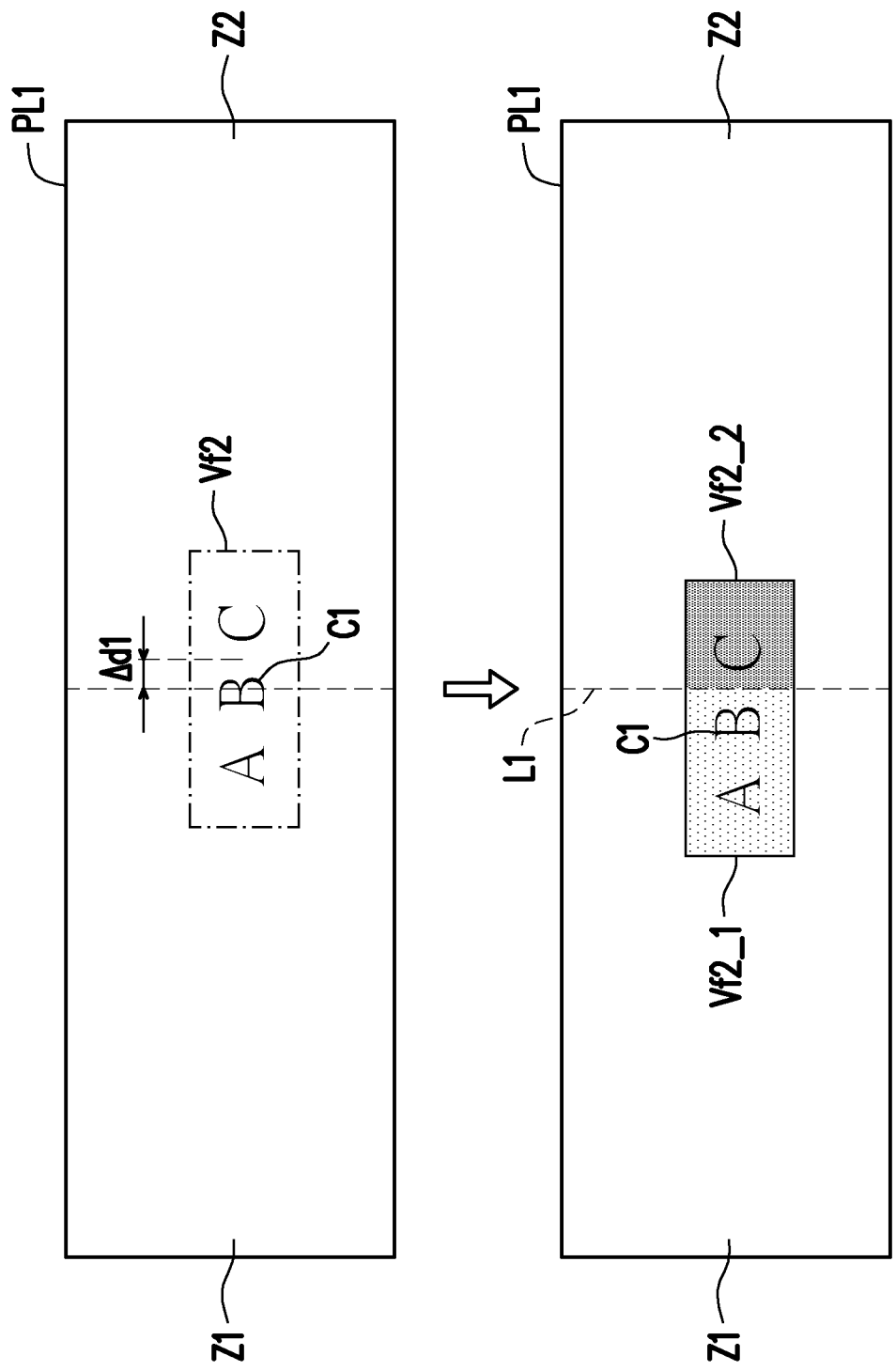
FIG. 4 is a schematic diagram of translating a virtual object according to an exemplary embodiment of the disclosure.

For example, FIG. 4 is a schematic diagram of translating a virtual object according to an exemplary embodiment of the disclosure. Referring to FIG. 4, in some embodiments, a virtual object Vf2 may include multiple characters. After acquiring fusion position information of the virtual object Vf2 on a spliced display plane PL1, the processing device 130 may determine whether a character C1 of the at least one virtual object Vf2 is located within a display range Z1 of a first light transmissive display and a display range Z2 of a second light transmissive display at the same time. In response to the fact that the character C1 of the at least one virtual object Vf2 is located within the display range Z1 of the first light transmissive display and the display range Z2 of the second light transmissive display at the same time, the processing device 130 calculates a translation amount $\Delta d1$ based on the character C1, and translates the at least one virtual object Vf2 according to the translation amount $\Delta d1$. As shown in FIG. 4, the virtual object Vf2 may be translated to the left by $\Delta d1$. Therefore, the processing device 130 may cut the translated at least one virtual object Vf2 into a first sub-virtual object Vf2_1 corresponding to the first light transmissive display and a second sub-virtual object Vf2_2 corresponding to the second light transmissive display along a display boundary L1. In this way, the character C1 may be completely displayed by the first light transmissive display without any break.

Figure 5A:
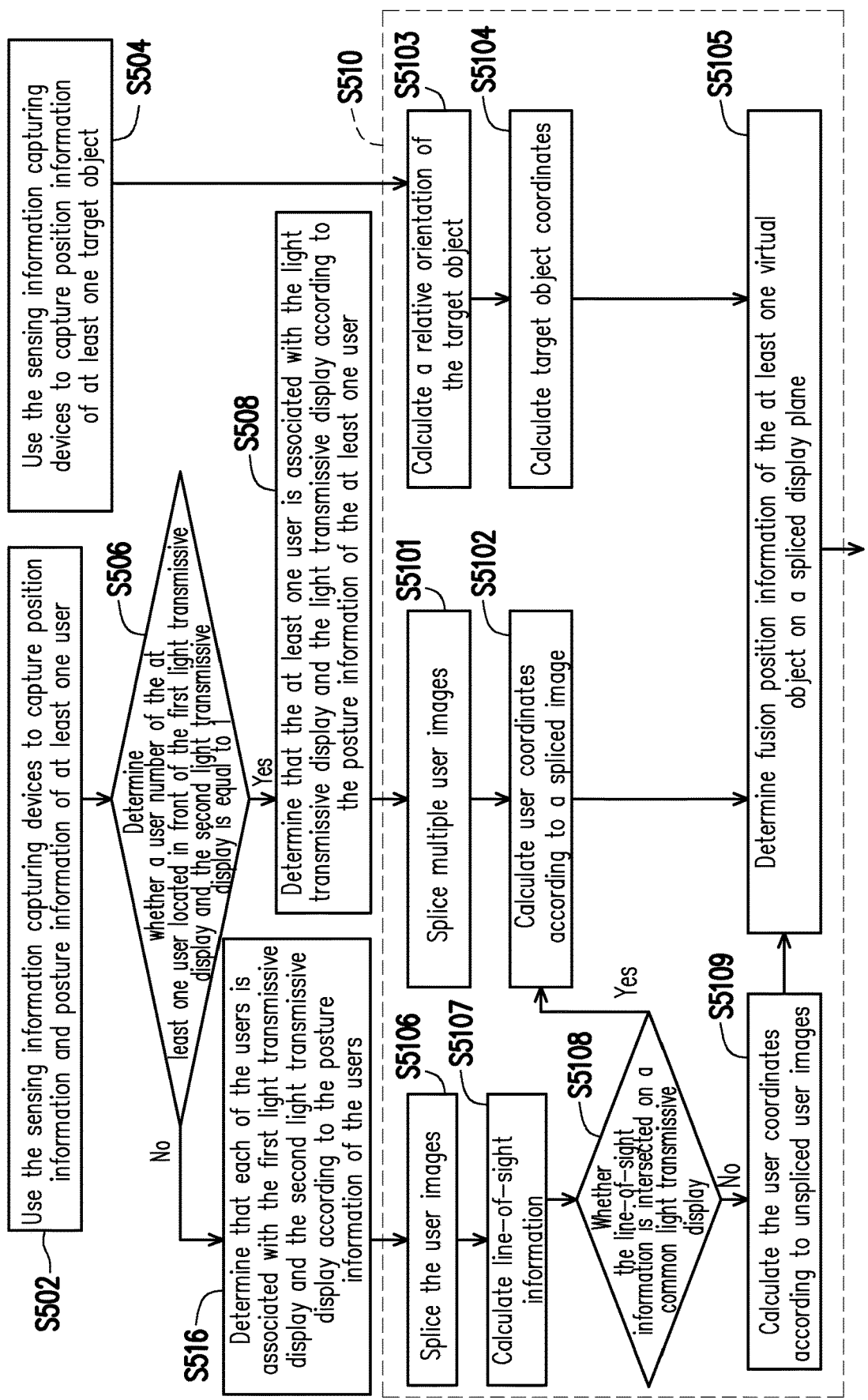
FIG. 5A and FIG. 5B are flowcharts of a method for information display according to an exemplary embodiment of the disclosure.
Figure 5B:
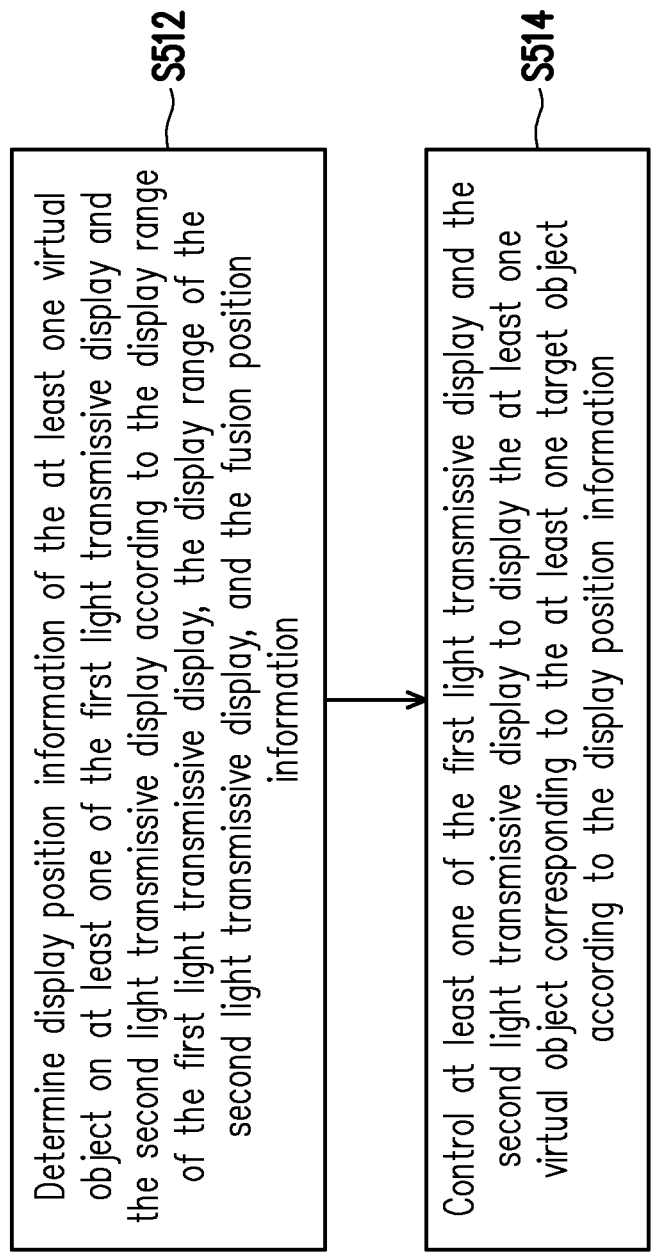
Figure 5C:
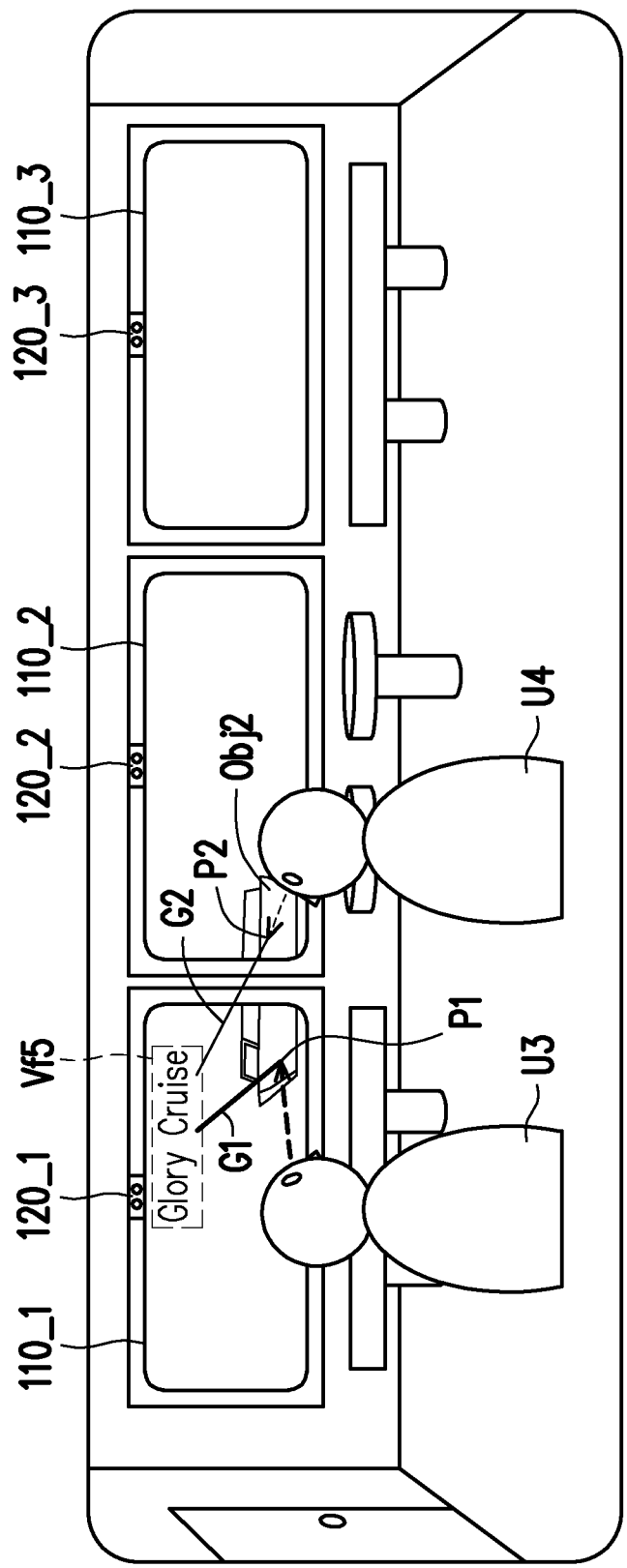
FIG. 5C is a schematic diagram of an application situation of a system for information display according to an exemplary embodiment of the disclosure.

FIG. 5A and FIG. 5B are flowcharts of a method for information display according to an exemplary embodiment of the disclosure. FIG. 5C is a schematic diagram of an application situation of a system for information display according to an exemplary embodiment of the disclosure. Referring to FIG. 5A, FIG. 5B and FIG. 5C at the same time, for convenience and clarity's sake, the embodiments of FIG. 5A to FIG. 5C will be described by taking three light transmissive displays 110_1-110_3 and three sensing information capturing devices 120_1-120_3 as examples, but the disclosure is not limited thereto.

The sensing information capturing device 120_1 and the sensing information capturing device 120_2 respectively capture position information and posture information of a user U3 and a user U4 (step S502), and transmit the position information and the posture information of the user U3 and the user U4 to the processing device 130. One or more the sensing information capturing devices 120_1 to 120_3 may capture position information of a target object Obj2 (step S504), and transmit the position information of the target object Obj2 to the processing device 130.

The processing device 130 determines whether the user number of users in front of the adjacent light transmissive display 110_1 (i.e., the first light transmissive display) and the light transmissive display 110_2 (i.e., the second light transmissive display) is equal to 1 (step S506). Although not shown in FIG. 5C, based on the aforementioned embodiments, it is known that when the user number of users in front of the light transmissive display 110_1 and the light transmissive display 110_2 is equal to 1, the processing device 130 determines that the user is associated with the light transmissive display 110_1 and the light transmissive display 110_2 according to the posture information of the user (step S508).

When the user number of users in front of the light transmissive display 110_1 and the light transmissive display 110_2 is greater than 1, in the exemplary embodiment of FIG. 5C, the processing device 130 may determine that each of the users U3 and U4 is associated with the light transmissive display 110_1 and the light transmissive display 110_2 according to the posture information of the users U3 and U4 (step S516). Namely, the multiple users U3 and U4 may share the light transmissive display 110_1 and the light transmissive display 110_2. When the user number of users in front of the light transmissive display 110_1 and the light transmissive display 110_2 is greater than 1, the processing device 130 may determine to associate the user U3 (i.e., a first user) with the light transmissive display 110_1 and the light transmissive display 110_2, and determine to associate the user U4 (i.e., a second user) with the light transmissive display 110_1 and the light transmissive display 110_2.

Then, the processing device 130 determines fusion position information of at least one virtual object Vf5 on a spliced display plane of the light transmissive display 110_1 and the light transmissive display 110_2 according to the position information and the posture information of the at least one user U3, U4 and the position information of the at least one target object Obj2.

For detailed operations of steps S5101-S5105, reference may be made to the aforementioned embodiments, and details thereof are not repeated. It should be noted that in the case that multiple users U3 and U4 share the adjacent light transmissive displays 110_1 and 120_2, the processing device 130 splices the user images respectively captured by the sensing information capturing device 120_1 and the sensing information capturing device 120_2 (step S5106). Then, the processing device 130 calculates line-of-sight information of the users U3 and U4 according to a spliced image (step S5107). The processing device 130 determines whether the line-of-sight information of the users U3 and U4 intersects on a common light transmissive display (step S5108).

In response to the fact that the line-of-sight information of the user U3 and the line-of-sight information of the user U4 are intersected on the common light transmissive display (i.e., the light transmissive display 110_1), the processing device 130 determines display position information of the at least one virtual object Vf5 on the common light transmissive display based on the spliced image. The spliced image includes a first user image having the user U3 and a second user image having the user U4. If a determination result of step S5108 is yes, the processing device 130 calculates user coordinates of the users U3 and U4 according to the spliced image (step S5102). Moreover, if the determination result of step S5108 is no, the processing device 130 respectively calculates the user coordinates of the users U3 and U4 according to the unspliced user images (step S5109). Finally, the processing device 130 may determine the fusion position information of the at least one virtual object Vf5 on the spliced display plane (step S5105).

Thereafter, the processing device 130 may determine display position information of the at least one virtual object Vf5 on at least one of the light transmissive display 110_1 and the light transmissive display 110_2 according to the display range of the light transmissive display 110_1, the display range of the light transmissive display 110_2 and the fusion position information (step S512). Then, the processing device 130 controls at least one of the light transmissive display 110_1 and the light transmissive display 110_2 to display the at least one virtual object Vf5 corresponding to the at least one target object Obj2 according to the display position information (step S514).

As shown in FIG. 5C, when it is determined that the users U3 and U4 view the same target object Obj2, the processing device 130 may display the virtual object Vf5 associated with the users U3 and U4 and corresponding to the target object Obj2 on the light transmissive display 110_1. In addition, the processing device 130 may mark information indication lines G1 and G2 respectively corresponding to the users U3 and U4 according to respective line-of-sight points P1 and P2 of the users U3 and U4. The information indication line G2 spans the light transmissive display 110_1 and the light transmissive display 110_2. However, in other embodiments, the processing device 130 may also display two virtual objects corresponding to the target object Obj2 on the light transmissive display 110_1 and the light transmissive display 110_2, respectively.

In some embodiments, the processing device 130 may track a movement state of the user. Since the processing device 130 may continuously update the display position information of the virtual object based on a user's tracking result, the virtual object may move correspondingly in response to the user's movement, so as to achieve a visual effect that the virtual object moves along with the user's movement. For example, when the user moves from the front of the first light transmissive display to the second light transmissive display, the same virtual object corresponding to the same target object may also be moved from the first light transmissive display to the second light transmissive display. An embodiment is provided below for further description.

Figure 6A:
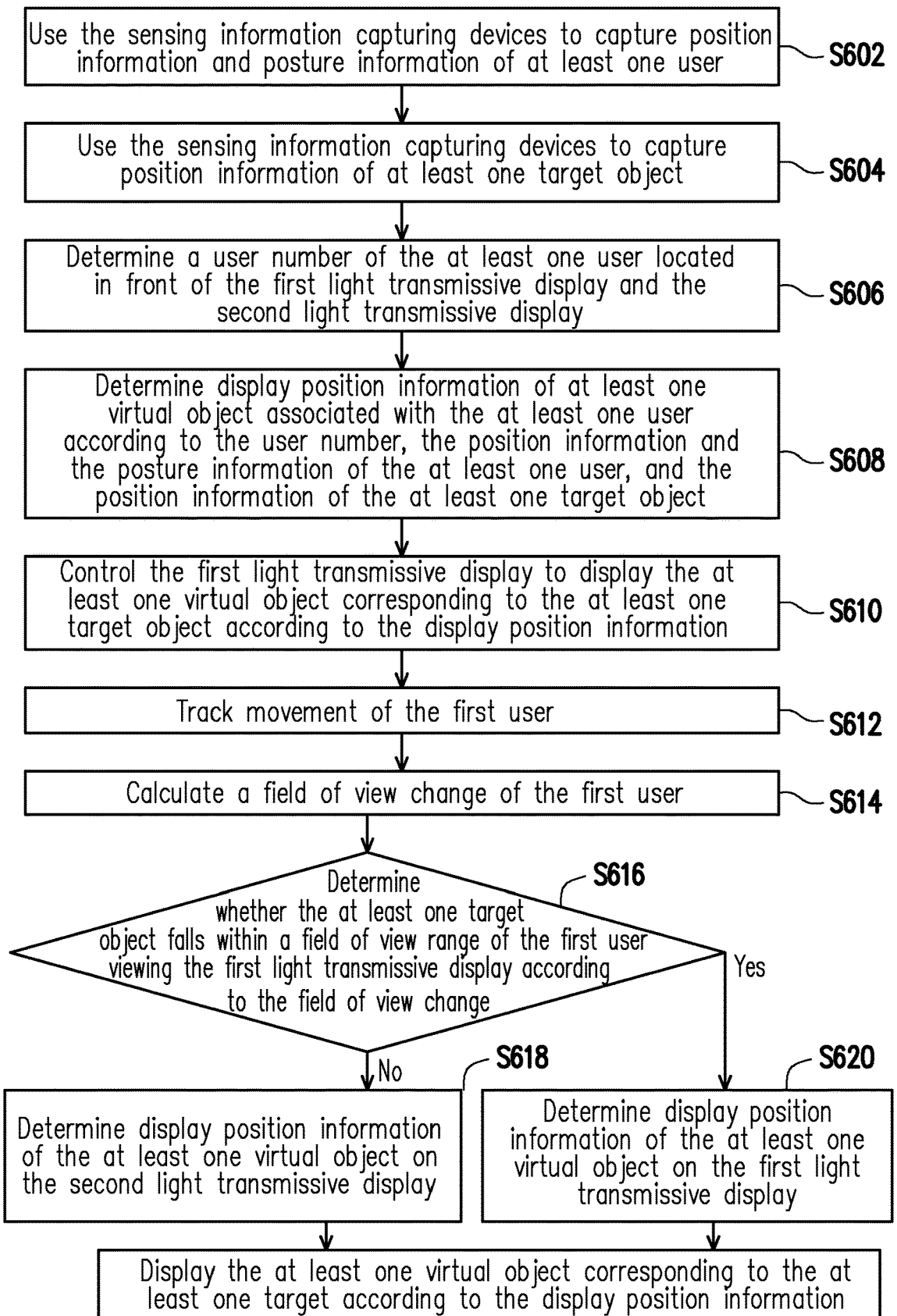
FIG. 6A is a flowchart of a method for information display according to an exemplary embodiment of the disclosure.
Figure 6B:
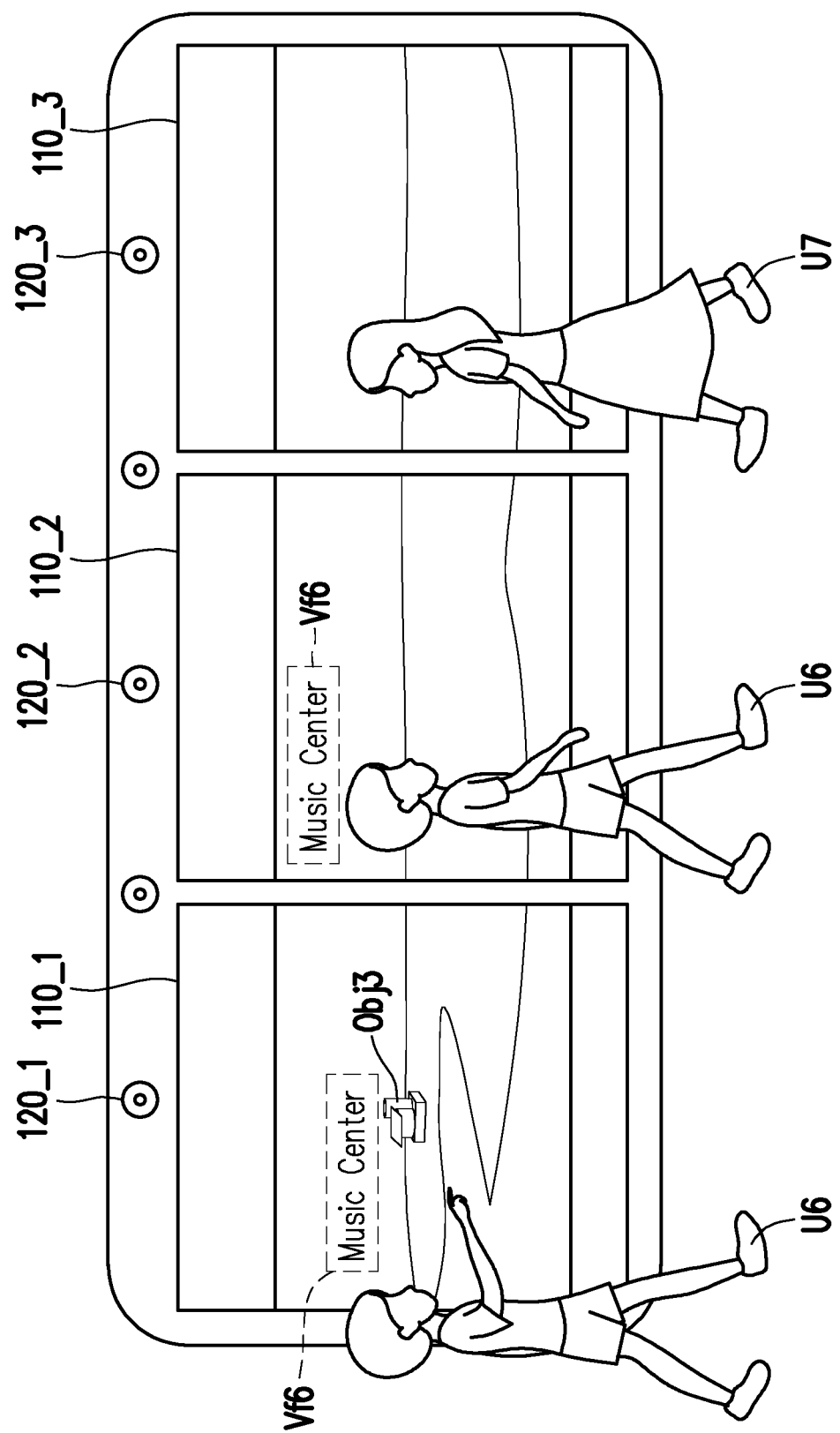
FIG. 6B is a schematic diagram of an application situation of a system for information display according to an exemplary embodiment of the disclosure.

FIG. 6A is a flowchart of a method for information display according to an exemplary embodiment of the disclosure. FIG. 6B is a schematic diagram of an application situation of a system for information display according to an exemplary embodiment of the disclosure. For convenience and clarity's sake, the embodiments of FIG. 6 and FIG. 6B will be described by taking three light transmissive displays 110_1-110_3 and three sensing information capturing devices 120_1-120_3 as examples, but the disclosure is not limited thereto.

It should be noted that in the embodiment of FIG. 6B, a user U6 moves from the front of the light transmissive display 110_1 to the front of the light transmissive display 110_2.

Referring to FIG. 6A and FIG. 6B at the same time, the sensing information capturing device 120_1 may capture position information and posture information of the user U6 (step S602), and transmit the position information and the posture information of the user U6 to the processing device 130. One or more of the sensing information capturing devices 120_1-120_3 may capture position information of a target object Obj3 (step S604), and transmit the position information of the target object Obj3 to the processing device 130. The processing device 130 determines the user number of users located in front of the light transmissive display 110_1 and the light transmissive display 110_2 (step S606). The processing device 130 determines display position information of at least one virtual object Vf6 associated with the at least one user U6 according to the user number of users, the position information and the posture information of the at least one user U6, and the position information of the at least one target object Obj3 (step S608). For the detailed implementation of steps S602-S608, reference may be made to the aforementioned embodiments, and details thereof are not repeated. It should be noted that, in the example of FIG. 6B, the processing device 130 may first control the light transmissive display 110_1 to display the at least one virtual object Vf6 corresponding to the at least one target object Obj3 according to the display position information of the virtual object Vf6 (step S610).

Then, the processing device 130 locates and tracks the user U6 according to the user image captured by the sensing information capturing device 120_1 (step S612). Furthermore, the user U6 may be assigned with a specific user ID by the processing device 130 to facilitate user tracking. During a movement process of the user U6, the processing device 130 may calculate a field of view change of the user U6 according to the position information and the posture information of the user U6 (step S614), and the processing device 130 determines whether the at least one target object Obj3 falls within a field of view range of the user U6 viewing the light transmissive display 110_1 according to the field of view change (step S616). In other words, the processing device 130 determines whether the user U6 may still view the target object Obj3 through the light transmissive display 110_1 according to the field of view change of the user U6.

If a determination result of step S616 is yes, the processing device 130 updates the display position information of the virtual object on the light transmissive display 110_1 according to the current position information and the posture information of the user U6 and the position information of the target object Obj3 (step S620). Otherwise, if the determination result of step S616 is no, in response to that the at least one target object Obj3 does not fall within the field of view range of the user U6 viewing the light transmissive display 110_1, the processing device 130 determines display position information of the virtual object Vf6 on the light transmissive display 110_2 according to the position information and the posture information of the user U6 and the position information of the at least one target object Obj3 (step S618). Then, the processing device 130 may control the light transmissive display 110_1 or the light transmissive display 110_2 to display the at least one virtual object corresponding to the at least one target object according to the display position information (step S622).

As shown in FIG. 6B, the user U6 moves from the front of the light transmissive display 110_1 to the front of the light transmissive display 110_2. When the user U6 gradually moves away from the light transmissive display 110_1, the user U6 is unable to view the target object Obj3 through the light transmissive display 110_1. Therefore, the virtual object Vf6 of the target object Obj3 may be switched to be displayed by the light transmissive display 110_2. In this way, the virtual object of the target object Obj3 may move correspondingly along with the user's movement, so as to achieve the visual effect that the virtual object moves along with the user's movement.

It should be noted that, in some situations, there may be another user U7 originally viewing the target object Obj3 through the light transmissive display 110_2. Therefore, in some embodiments, in response to that the at least one target object Obj3 does not fall within the field of view range of the user U6 viewing the light transmissive display 110_1, the processing device 130 may determine the display position information of the virtual object Vf6 on the light transmissive display 110_2 according to the position information and the posture information of the user U6, position information and posture information of the user U7, and the position information of the target object Obj3. Namely, when switching the virtual object of the target object Obj3 to the light transmissive display 110_2 for display, the processing device 130 may determine a display position of the virtual object Vf6 on the light transmissive display 110_2 by considering the position information and the posture information of the user U6 and the user U7 together.

In addition, the light transmissive displays in the aforementioned embodiments are all coplanar. However, in some embodiments, these light transmissive displays may be disposed in a non-coplanar manner. For example, when the first light transmissive display and the second light transmissive display are respectively viewing windows facing different directions on a cableway carriage, there may be an included angle between a display plane of the first light transmissive display and a display plane of the second light transmissive display. Examples are provided below to describe the implementation of such application situation.

Figure 7A:
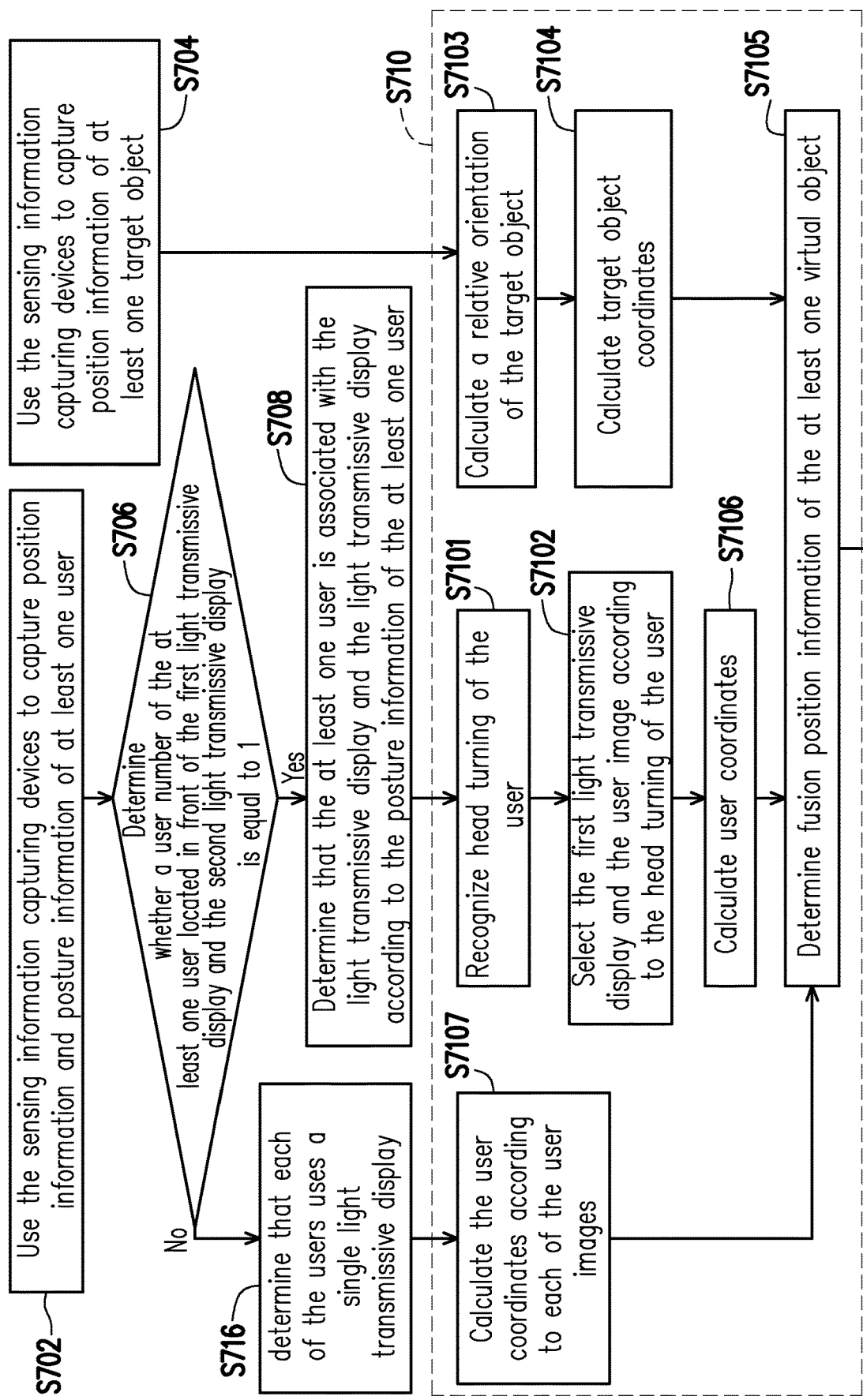
FIG. 7A and FIG. 7B are flowcharts of a method for information display according to an exemplary embodiment of the disclosure.
Figure 7B:
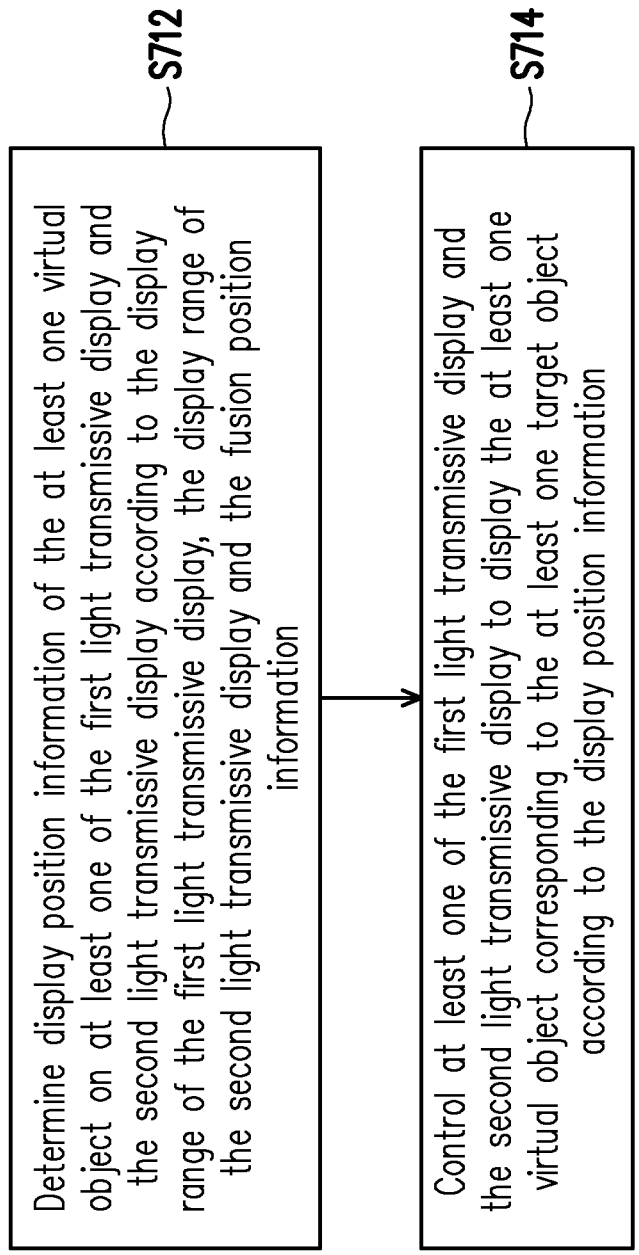

FIG. 7A and FIG. 7B are flowcharts of a method for information display according to an exemplary embodiment of the disclosure. FIG. 7C is a schematic diagram of an application situation of a system for information display according to an exemplary embodiment of the disclosure. Referring to FIG. 7A, FIG. 7B and FIG. 7C at the same time.

As shown in FIG. 7C, there may be an included angle between a display plane of the light transmissive display 110_1 and a display plane of the light transmissive display 110_2. The sensing information capturing devices 110_1 and 110_2 may capture position information and posture information of a user U8 (step S702), and transmit the position information and the posture information of the user U8 to the processing device 130. One or more of the sensing information capturing devices 120_1-120_3 may capture position information of a target object (step S704), and transmit the position information of the target object to the processing device 130.

The processing device 130 determines whether the user number of users in front of the adjacent light transmissive display 110_1 (i.e., the first light transmissive display) and the light transmissive display 110_2 (i.e., the second light transmissive display) is equal to 1 (step S706). When the user number of users is equal to 1, the processing device 130 determines that the at least one user U8 is associated with the light transmissive display 110_1 and the light transmissive display 110_2 according to the posture information of the at least one user U8 (step S708). In addition, when the user number of users is greater than 1, in the embodiment, the processing device 130 may determine that each of the users uses one of the light transmissive displays 110_1 to -110_3 (step S716), i.e., each user has the authority to use a single light transmissive display.

Then, the processing device 130 determines display position information of the at least one virtual object associated with the at least one user U8 according to the position information and the posture information of the user U8 and the position information of the target object (step S710). When the user number of users is greater than 1, the processing device 130 may individually calculate the user coordinates of each user according to the user images captured by the sensing information capturing devices 110_1 to 110_3 (step S7107).

In addition, when the user number of users is equal to 1, the processing device 130 may recognize head turning of the user U8 (step S7101), and the processing device 130 may select the light transmissive display 110_1 and the user image according to the head turning of the user U8 (step S7102). Although the user U8 has the authority to view the virtual object through the light transmissive display 110_1 and the light transmissive display 110_2, the processing device 130 may decide to use the light transmissive display 110_1 to display the virtual object for the user U8 to watch according to the head turning of the user U8. In addition, the processing device 130 may select the user image captured by the sensing information capturing device 120_1 to calculate the user coordinates (step S7106). In other embodiments, the processing device 130 may further identify a line-of-sight direction of the user U8, so as to select the light transmissive display 110_1 and the user image according to the line-of-sight direction of the user U8.

On the other hand, the processing device 130 may calculate a relative orientation of the target object (step S7103). Then, the processing device 130 may calculate target object coordinates of the target object according to the relative orientation of the target object (step S7104). Then, the processing device 130 may acquire fusion position information according to the user coordinates and the target object coordinates (step S7105). Then, the processing device 130 may determine the display position information of the at least one virtual object on at least one of the light transmissive display 110_1 and the light transmissive display 110_2 according to the display range of the light transmissive display 110_1, the display range of the light transmissive display 110_2 and the fusion position information (step S712). Then, the processing device 130 controls at least one of the light transmissive display 110_1 and the light transmissive display 110_2 to display the at least one virtual object corresponding to the at least one target object according to the display position information (step S714).

In summary, the method, the processing device, and the system for information display provided by the exemplary embodiments of the disclosure may determine whether it is a single-person viewing situation or a multi-person viewing situation based on the user number of users in front of the adjacent light transmissive displays. When operating in the single-person viewing situation, a cross-screen display function may be provided by multiple light transmissive displays. When operating in the multi-person viewing situation, multiple light transmissive displays may be used to provide the cross-screen display function according to different application situations. In the embodiments of the disclosure, the display position information of the virtual object may be calculated in real-time according to the user position and the target object position. In this way, the virtual object may follow the target object or the user to implement cross-screen display in real-time, thereby improving the viewing experience of the user. In addition, the embodiment of the disclosure may avoid occurrence of characters in the virtual object being broken and displayed in different light transmissive displays, thereby improving viewing comfort of the virtual object.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A system for information display, comprising:
a plurality of light transmissive displays, wherein the light transmissive displays comprise a first light transmissive display and a second light transmissive display, and the first light transmissive display and the second light transmissive display are disposed adjacent to each other;
a plurality of sensing information capturing devices, configured to capture position information and posture information of at least one user and capture position information of at least one target object;
a processing device, connected to the light transmissive displays and the sensing information capturing devices, and configured to:
determine whether a user number of the at least one user located in front of the first light transmissive display and the second light transmissive display is equal to 1 or greater than 1;
determine display position information of at least one virtual object associated with the at least one user according to whether the user number is equal to 1 or greater than 1 and according to the position information and the posture information of the at least one user, and the position information of the at least one target object; and
control at least one of the first light transmissive display and the second light transmissive display to display the at least one virtual object corresponding to the at least one target object according to the display position information,
wherein the processing device is configured to:
determine that the at least one user is associated with the first light transmissive display and the second light transmissive display according to the posture information of the at least one user when the user number is equal to 1;

determine fusion position information of the at least one virtual object on a spliced display plane of the first light transmissive display and the second light transmissive display according to the position information and the posture information of the at least one user and the position information of the at least one target object; and determine the display position information of the at least one virtual object on at least one of the first light transmissive display and the second light transmissive display according to a display range of the first light transmissive display, a display range of the second light transmissive display, and the fusion position information.

2. The system for information display according to claim 1, wherein the processing device is configured to:

determine whether the at least one virtual object is located within the display range of the first light transmissive display and the display range of the second light transmissive display at the same time according to the display range of the first light transmissive display, the display range of the second light transmissive display, and the fusion position information;

cut the at least one virtual object into a first sub-virtual object corresponding to the first light transmissive display and a second sub-virtual object corresponding to the second light transmissive display in response to that the at least one virtual object is located within the display range of the first light transmissive display and the display range of the second light transmissive display at the same time; and calculate first display position information of the first sub-virtual object on the first light transmissive display based on the fusion position information, and calculate second display position information of the second sub-virtual object on the second light transmissive display based on the fusion position information.

3. The system for information display according to claim 2, wherein the processing device is configured to:

determine whether a character of the at least one virtual object is located within the display range of the first light transmissive display and the display range of the second light transmissive display at the same time;

calculate a translation amount based on the character, and translate the at least one virtual object according to the translation amount in response to that the character of the at least one virtual object is located within the display range of the first light transmissive display and the display range of the second light transmissive display at the same time; and cut the translated at least one virtual object into the first sub-virtual object corresponding to the first light transmissive display and the second sub-virtual object corresponding to the second light transmissive display.

4. The system for information display according to claim 1, wherein the processing device is configured to:

when the user number is greater than 1, and the at least one user comprises a first user and a second user, determine to associate the first user with the first light transmissive display and the second light transmissive display, and determine to associate the second user with the first light transmissive display and the second light transmissive display; and in response to that line-of-sight information of the first user and line-of-sight information of the second user are intersected on a common light transmissive display, determine the display position information of the at least one virtual object on the common light transmissive display based on a spliced image, wherein the spliced image comprises a first user image having the first user and a second user image having the second user.

5. The system for information display according to claim 1, wherein the at least one user comprises a first user, and the processing device is configured to:

calculate a field of view change of the first user in response to movement of the first user;

determine whether the at least one target object falls within a field of view range of the first user viewing the first light transmissive display according to the field of view change; and determine the display position information of the at least one virtual object on the second light transmissive display according to position information and posture information of the first user and the position information of the at least one target object in response to that the at least one target object does not fall within the field of view range of the first user viewing the first light transmissive display.

6. The system for information display according to claim 5, wherein the at least one user further comprises a second user, and the processing device is configured to:

determine the display position information of the at least one virtual object on the second light transmissive display according to the position information and the posture information of the first user, position information and posture information of the second user, and the position information of the at least one target object in response to that the at least one target object does not fall within the field of view range of the first user viewing the first light transmissive display.

7. The system for information display according to claim 1, wherein there is an included angle between a display plane of the first light transmissive display and a display plane of the second light transmissive display, and the processing device is configured to:

determine that the at least one user is associated with the first light transmissive display and the second light transmissive display according to the posture information of the at least one user when the user number is equal to 1;

select the first light transmissive display according to head turning of the at least one user; and determine the display position information of the at least one virtual object associated with the at least one user on the first light transmissive display according to the position information and the posture information of the at least one user, and the position information of the at least one target object.

8. A method for information display, adapted to a system for information display comprising a plurality of light transmissive displays, a plurality of sensing information capturing devices, and a processing device, wherein the light transmissive displays comprise a first light transmissive display and a second light transmissive display, the first light transmissive display and the second light transmissive display are disposed adjacent to each other, and the method comprises:

using the sensing information capturing devices to capture position information and posture information of at least one user;

using the sensing information capturing devices to capture position information of at least one target object;

determining whether a user number of the at least one user located in front of the first light transmissive display and the second light transmissive display is equal to 1 or greater than 1;

determining display position information of at least one virtual object associated with the at least one user according to whether the user number is equal to 1 or greater than 1 and according to the position information and the posture information of the at least one user, and the position information of the at least one target object; and controlling at least one of the first light transmissive display and the second light transmissive display to display the at least one virtual object corresponding to the at least one target object according to the display position information, wherein determining the display position information of the at least one virtual object associated with the at least one user according to the user number, the position information and the posture information of the at least one user, and the position information of the at least one target object comprises:

determining that the at least one user is associated with the first light transmissive display and the second light transmissive display according to the posture information of the at least one user when the user number is equal to 1;

determining fusion position information of the at least one virtual object on a spliced display plane of the first light transmissive display and the second light transmissive display according to the position information and the posture information of the at least one user and the position information of the at least one target object; and determining the display position information of the at least one virtual object on at least one of the first light transmissive display and the second light transmissive display according to a display range of the first light transmissive display, a display range of the second light transmissive display, and the fusion position information.

9. The method for information display according to claim 8, wherein determining the display position information of the at least one virtual object on at least one of the first light transmissive display and the second light transmissive display according to the display range of the first light transmissive display, the display range of the second light transmissive display, and the fusion position information comprises:

determining whether the at least one virtual object is located within the display range of the first light transmissive display and the display range of the second light transmissive display at the same time according to the display range of the first light transmissive display, the display range of the second light transmissive display, and the fusion position information;

cutting the at least one virtual object into a first sub-virtual object corresponding to the first light transmissive display and a second sub-virtual object corresponding to the second light transmissive display in response to that the at least one virtual object is located within the display range of the first light transmissive display and the display range of the second light transmissive display at the same time; and calculating first display position information of the first sub-virtual object on the first light transmissive display based on the fusion position information, and calculating second display position information of the second sub-virtual object on the second light transmissive display based on the fusion position information.

10. The method for information display according to claim 9, wherein cutting the at least one virtual object into the first sub-virtual object corresponding to the first light transmissive display and the second sub-virtual object corresponding to the second light transmissive display in response to that the at least one virtual object is located within the display range of the first light transmissive display and the display range of the second light transmissive display at the same time comprises:

determining whether a character of the at least one virtual object is located within the display range of the first light transmissive display and the display range of the second light transmissive display at the same time;

calculating a translation amount based on the character, and translating the at least one virtual object according to the translation amount in response to that the character of the at least one virtual object is located within the display range of the first light transmissive display and the display range of the second light transmissive display at the same time; and cutting the translated at least one virtual object into the first sub-virtual object corresponding to the first light transmissive display and the second sub-virtual object corresponding to the second light transmissive display.

11. The method for information display according to claim 8, wherein determining the display position information of the at least one virtual object associated with the at least one user according to the user number, the position information and the posture information of the at least one user, and the position information of the at least one target object comprises:

when the user number is greater than 1, and the at least one user comprises a first user and a second user, determining to associate the first user with the first light transmissive display and the second light transmissive display, and determining to associate the second user with the first light transmissive display and the second light transmissive display; and in response to that line-of-sight information of the first user and line-of-sight information of the second user are intersected on a common light transmissive display, determining the display position information of the at least one virtual object on the common light transmissive display based on a spliced image, wherein the spliced image comprises a first user image having the first user and a second user image having the second user.

12. The method for information display according to claim 8, wherein the at least one user comprises a first user, and the method further comprises:

calculating a field of view change of the first user in response to movement of the first user;

determining whether the at least one target object falls within a field of view range of the first user viewing the first light transmissive display according to the field of view change; and determining the display position information of the at least one virtual object on the second light transmissive display according to position information and posture information of the first user and the position information of the at least one target object in response to that the at least one target object does not fall within the field of view range of the first user viewing the first light transmissive display.

13. The method for information display according to claim 12, wherein the at least one user comprises a second user, and determining the display position information of the at least one virtual object on the second light transmissive display according to the position information and the posture information of the first user and the position information of the at least one target object in response to that the at least one target object does not fall within the field of view range of the first user viewing the first light transmissive display comprises:
- determining the display position information of the at least one virtual object on the second light transmissive display according to the position information and the posture information of the first user, position information and posture information of the second user, and the position information of the at least one target object in response to that the at least one target object does not fall within the field of view range of the first user viewing the first light transmissive display.

14. The method for information display according to claim 8, wherein there is an included angle between a display plane of the first light transmissive display and a display plane of the second light transmissive display, and determining the display position information of the at least one virtual object associated with the at least one user according to the user number, the position information and the posture information of the at least one user, and the position information of the at least one target object comprises:
- determining that the at least one user is associated with the first light transmissive display and the second light transmissive display according to the posture information of the at least one user when the user number is equal to 1;
- selecting the first light transmissive display according to head turning of the at least one user; and
- determining the display position information of the at least one virtual object associated with the at least one user on the first light transmissive display according to the position information and the posture information of the at least one user, and the position information of the at least one target object.

15. A processing device, connected to a plurality of light transmissive displays and a plurality of sensing information capturing devices, wherein the light transmissive displays comprise a first light transmissive display and a second light transmissive display, the first light transmissive display and the second light transmissive display are disposed adjacent to each other, and the processing device comprises:
- a memory, configured to store data; and
- a processor, connected to the memory and configured to:
  - obtain position information and posture information of at least one user from the sensing information capturing devices;
  - obtain position information of at least one target object from the sensing information capturing devices;
  - determine whether a user number of the at least one user located in front of the first light transmissive display and the second light transmissive display is equal to 1 or greater than 1;
  - determine display position information of at least one virtual object associated with the at least one user according to whether the user number is equal to 1 or greater than 1 and according to the position information and the posture information of the at least one user and the position information of the at least one target object; and
  - control at least one of the first light transmissive display and the second light transmissive display to display the at least one virtual object corresponding to the at least one target object according to the display position information, wherein the processor is configured to:
- determine that the at least one user is associated with the first light transmissive display and the second light transmissive display according to the posture information of the at least one user when the user number is equal to 1;
- determine fusion position information of the at least one virtual object on a spliced display plane of the first light transmissive display and the second light transmissive display according to the position information and the posture information of the at least one user and the position information of the at least one target object; and
- determine the display position information of the at least one virtual object on at least one of the first light transmissive display and the second light transmissive display according to a display range of the first light transmissive display, a display range of the second light transmissive display, and the fusion position information.

* * * * *